United States Patent
Shakhmetov et al.

(10) Patent No.: US 9,350,624 B2
(45) Date of Patent: May 24, 2016

(54) DYNAMIC ASSIGNMENT OF CONNECTION PRIORITIES FOR APPLICATIONS OPERATING ON A CLIENT DEVICE

(71) Applicant: Rawllin International Inc., Tortola (VG)

(72) Inventors: Maksim Shakhmetov, Saint-Petersburg (RU); Denis Kulikov, Saint-Petersburg (RU)

(73) Assignee: Rawllin International Inc., Tortola (VG)

( * ) Notice: Subject to any disclaimer, the term of this patent is extended or adjusted under 35 U.S.C. 154(b) by 282 days.

(21) Appl. No.: 14/054,490

(22) Filed: Oct. 15, 2013

(65) Prior Publication Data
US 2015/0106502 A1    Apr. 16, 2015

(51) Int. Cl.
| | | |
|---|---|---|
| G06F 15/16 | (2006.01) |
| H04L 12/24 | (2006.01) |
| H04L 12/911 | (2013.01) |
| H04L 29/08 | (2006.01) |
| H04W 72/10 | (2009.01) |
| H04L 12/917 | (2013.01) |
| H04L 12/927 | (2013.01) |
| H04L 12/26 | (2006.01) |

(52) U.S. Cl.
CPC ............ *H04L 41/5003* (2013.01); *H04L 47/70* (2013.01); *H04L 47/76* (2013.01); *H04L 47/803* (2013.01); *H04L 67/322* (2013.01); *H04W 72/10* (2013.01); *H04L 41/0896* (2013.01); *H04L 43/0876* (2013.01)

(58) Field of Classification Search
CPC .. H04L 43/0876; H04L 47/70; H04L 41/0896
See application file for complete search history.

(56) References Cited

U.S. PATENT DOCUMENTS

| | | | |
|---|---|---|---|
| 5,910,951 A | 6/1999 | Pearce et al. | |
| 6,963,741 B2 | 11/2005 | Johansson et al. | |
| 7,293,091 B2 * | 11/2007 | Eatough | H04L 47/20 370/395.21 |
| 7,324,523 B2 * | 1/2008 | Dacosta | H04L 41/0896 370/345 |
| 7,680,897 B1 * | 3/2010 | Carter | H04L 12/5695 709/217 |
| 7,747,255 B2 * | 6/2010 | Dacosta | H04L 41/0896 370/395.41 |
| 7,809,387 B2 | 10/2010 | Chaudry et al. | |
| 7,823,155 B2 * | 10/2010 | Misra | H04L 43/12 370/252 |

(Continued)

FOREIGN PATENT DOCUMENTS

WO    WO 2010/084479    *  7/2010

*Primary Examiner* — Moustafa M Meky
(74) *Attorney, Agent, or Firm* — Amin, Turocy & Watson, LLP

(57) ABSTRACT

Providing for prioritization of applications operating on a client device with respect to access to online content or services is described herein. By way of example, the prioritizing can be correlated with allocation of network resources for respective applications. An application having higher priority can be allocated a larger amount of resources, a guaranteed amount of resources, a guaranteed quality of service, first access to resources, or the like. Likewise, an application with lower priority can be allocated a lower amount of resources, have best effort resources, access to residual resources, and so forth. In various embodiments, applications can be prioritized based on a status of the application with respect to the client device. As one illustrative example, applications actively receiving content, responding to user commands, or maximized or displayed on a graphic display can be afforded higher priority, whereas inactive or minimized applications can be afforded a lower priority.

37 Claims, 12 Drawing Sheets

(56) References Cited

U.S. PATENT DOCUMENTS

| | | |
|---|---|---|
| 7,870,231 B2 | 1/2011 | Mudireddy et al. |
| 7,929,542 B2 * | 4/2011 | Purpura .................. H04L 12/24 370/230 |
| 7,944,827 B2 * | 5/2011 | Wang .................. H04L 12/5695 370/230 |
| 8,503,315 B2 * | 8/2013 | Wittgreffe ................. H04J 3/14 370/252 |
| 2002/0062395 A1 | 5/2002 | Thompson et al. |
| 2008/0139197 A1 * | 6/2008 | Misra ...................... H04L 43/12 455/423 |
| 2009/0081996 A1 | 3/2009 | Duggal et al. |
| 2009/0279489 A1 | 11/2009 | Deu-Ngoc et al. |
| 2009/0279562 A1 * | 11/2009 | Wang .................. H04L 12/5695 370/431 |
| 2010/0177704 A1 | 7/2010 | Rajkotia |
| 2012/0207063 A1 | 8/2012 | Shaw |
| 2014/0241299 A1 * | 8/2014 | Zhao ..................... H04L 47/765 370/329 |
| 2015/0019624 A1 * | 1/2015 | Jayakeerthy ........... H04L 67/14 709/203 |
| 2015/0019740 A1 * | 1/2015 | Zhao .................. H04L 41/5022 709/226 |

\* cited by examiner

DYNAMIC ASSIGNMENT OF CONNECTION PRIORITIES FOR APPLICATIONS OPERATING ON A CLIENT DEVICE

TECHNICAL FIELD

The subject disclosure refers generally to managing network-related content or services, e.g., to dynamic assignment of priority related to network content for client applications.

BACKGROUND

Content and service providers generally employ multi-access servers to handle client communication or content requests, provide encryption or other security, and to track usage for billing content and services consumed by devices. For high data applications and related content archiving, large capacity data storage devices are often utilized and configured to store this content, and in conjunction with the multi-access servers, permit access to subsets of the stored content. Common modern examples of online content or services include multimedia content such as movies, episode-based television content such as sitcoms, news programs, and other audio/video content, as well as audio content, and even real time interactive audio/video content, single-player or multi-player games, as well as communication services, blogs, online forums, e-mail, text messaging, multimedia messaging, and so on.

In the past, network communications largely involved employing a client device for accessing information on a server (e.g., an FTP server), accessing an html page on the World Wide Web (web page) to view content posted to the web page, or the like. The information was downloaded and displayed onto a display of the client device for consumption by a user. Though network communications are known to have latency, data loss and other variable conditions that degrade quality or speed of traffic, redundancy is built into such communications to ensure that a requested resource will eventually be delivered to the client device. In a paradigm of downloaded data displayed on a device in which the acquiring an accurate copy of the data is not in doubt, the main performance factor affecting user satisfaction is time taken to download and display data, after sending a request. However, in a paradigm of real-time communications or streaming media, additional conditions affect consumer satisfaction.

In the case of electronic voice communications, whether analog or digital, sufficient signal clarity, noise reduction and bandwidth are involved in providing a clear, uninterrupted and continuous audio representation of a speaker's voice to a listener. Video conferencing presents a similar challenge, with higher resource consumption. To convey audio and video together synchronously, and with good clarity, sufficient network resources are involved to encode and transmit both audio and video data at a sufficient speed among network devices. The number of resources to transmit audio and video over a network is generally much more than for audio alone, for instance, for higher resolutions of video (e.g., 720p resolution, 1080p resolution). Similarly, streaming media content, including streaming audio, streaming video, or streaming audio/video (e.g., an online video or cinematic movie), can involve relatively high bandwidth or data rates to deliver content to a client with sufficient continuity to provide an enjoyable playback experience. In the case of downloading a webpage, insufficient network resources to yield a fast data transfer can be merely a slight inconvenience, but where continuity of streaming media is involved, insufficient resources to provide audio/video continuity can significantly degrade user satisfaction with network-sourced content.

As illustrated with the data download paradigm to the streaming media content or real-time communication paradigm, changes in network communication technology can lead to new challenges in meeting customer expectations. Network communication technology is generally adapting and changing to meet these new expectations. These and other evolutions of communication technology drive much of modern research and development to keep up with consumer demand.

SUMMARY

The following description and the annexed drawings set forth in detail certain illustrative aspects of the disclosed subject matter. These aspects are indicative, however, of but a few of the various ways, or embodiments, in which the principles of the disclosed subject matter may be implemented. The disclosed subject matter is intended to include all such embodiments and their equivalents. Other advantages and distinctive features of the disclosed subject matter will become apparent from the following detailed description of the various embodiments when considered in conjunction with the drawings.

Aspects of the subject disclosure provide for prioritizing applications operating on a client device with respect to access to online content or services (referred to collectively herein as online content, network content, or content). The prioritizing can relate to allocation of network resources, in various disclosed embodiments. An application having higher priority can be allocated a larger amount of resources, a guaranteed amount of resources, a guaranteed quality of service (QoS), first access to resources, or the like. Likewise, an application with lower priority can be allocated a lower amount of resources, have best effort resources, access to residual resources (resources left after higher priority allocations), and so forth.

According to additional aspects, prioritization of client applications can be related to a status of an application operating on a client device. The application status can be a function of, for instance, client processing resources, display status (e.g., minimized, background display, foreground display, or the like), response to user interface commands, or the like. In response to allocating network-side resources on an application-specific basis in relation to the prioritization, higher priority applications can be given increased priority for network resources, to facilitate improved network performance of these higher priority applications.

In still other aspects, application-related activity of a client device can be monitored to identify changes in status of applications. Changes in application priority and network resource priority can be implemented in response to identified changes in application status. Analysis of application priority can be performed periodically in some disclosed aspects, or at a rate simulating real-time analysis in other aspects, or at some other suitable periodic or a-periodic frequency.

Changes in application status can be inferred from network activity identified with an application in one or more embodiments. In other embodiments, changes in application status can be determined from an explicit report transmitted by a client application or the client device. In yet other embodiments, changes in application status can be received from a content server facilitating provision of online content for the client device.

In one or more additional embodiments of the subject disclosure, provided are one or more systems. One sample system can comprise a memory to store instructions and a processor, communicatively coupled to the memory, that executes or facilitates execution of the instructions. According to various examples, the instructions can comprise a client-side application monitoring component configured to identify a status of an application operating on a device. The sample instructions can further comprise a service-side resource monitoring component configured to track network resource availability of a service network associated with the device. The sample instructions can also comprise a resource management component configured to compare resource demand of the application with a metric of resource availability of the service network, and modify allocation of service network resources to the application in response to a determination that the status of the application is a predetermined status, and in response to a determination that the resource demand satisfies a function with respect to resources currently allocated to the application.

In other embodiments, the subject disclosure provides one or more methods. An example method can comprise monitoring, by a system comprising a processor, network-side traffic related to applications operating on a client device. The example method can further comprise obtaining an indication of a change in application state from inactive state to active state for an application of the applications. The example method can additionally comprise determining a level of network resources to be allocated to the one of the application of the applications in the active state. Moreover, the example method can comprise requesting a network access point to modify allocated resources to meet the level of network resources.

According to further embodiments, disclosed are one or more non-transitory computer readable media. An example computer readable medium can comprise computer-executable instructions that, in response to execution, cause a system comprising a processor to perform actions. Examples of such actions can comprise monitoring application status for applications operating on a client of a communication network. The actions can further comprise identifying an active application of the applications operating on the client, wherein the active application is displayed in a foreground of a graphic display of the client. Moreover, the method can comprise detecting network traffic related to an online service being addressed for the active application. In addition to the foregoing, the actions can comprise managing real-time allocation of network resources for the active application in response to changes in client-side conditions or network-side conditions of a client-network communication involving the client.

The following description and the annexed drawings set forth in detail certain illustrative aspects of the disclosed subject matter. These aspects are indicative, however, of but a few of the various ways in which the principles of the disclosed subject matter can be employed and the disclosed subject matter is intended to include all such aspects and their equivalents. Other advantages and novel features of the disclosed subject matter will become apparent from the following detailed description when considered in conjunction with the drawings.

DETAILED DESCRIPTION

Figure 1:
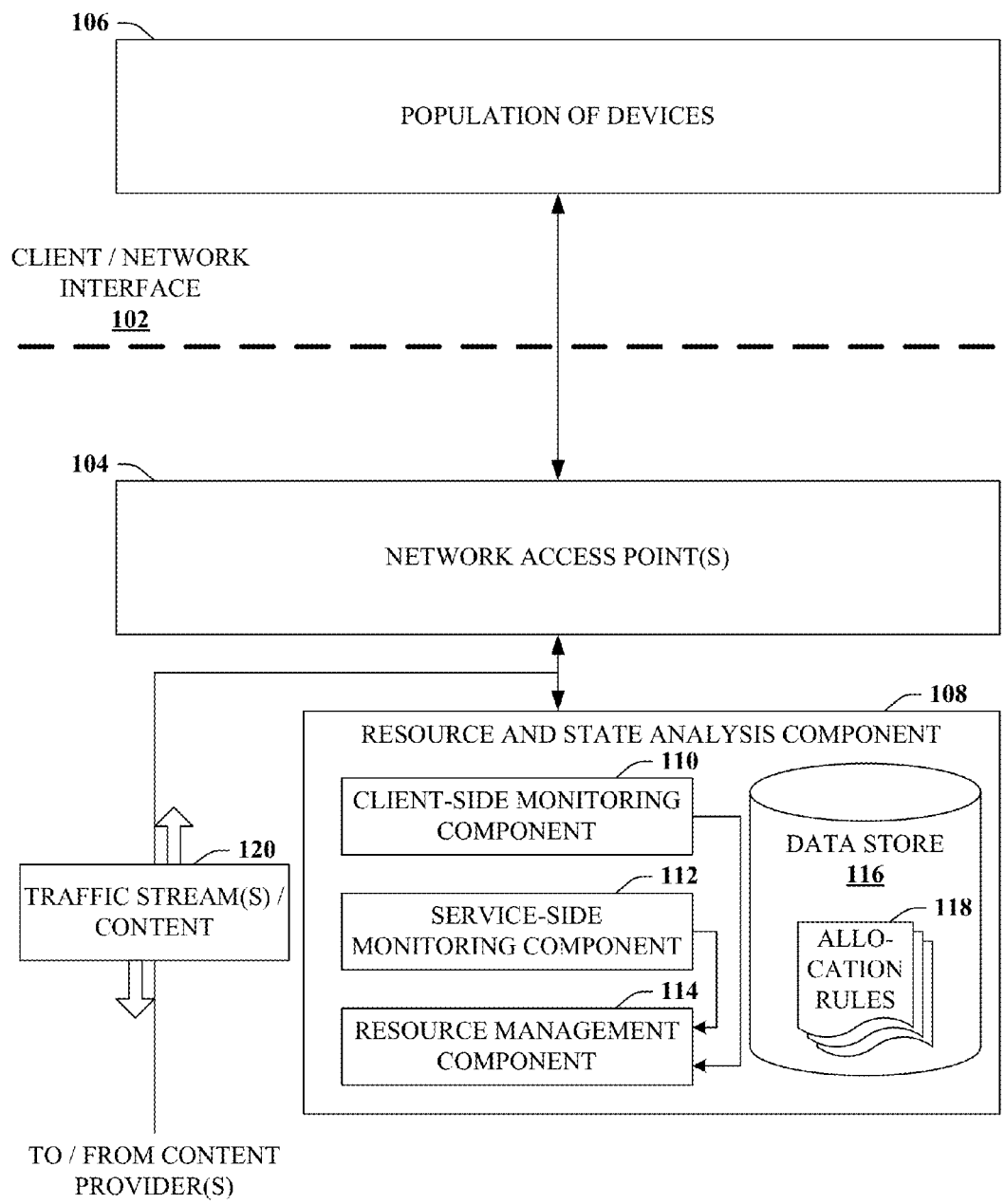
FIG. 1 illustrates a block diagram of an example system that facilitates prioritizing client application traffic according to embodiments disclosed herein.

The disclosed subject matter is described with reference to the drawings, wherein like reference numerals are used to refer to like elements throughout the description. In the following description, for purposes of explanation, numerous specific details are set forth in order to provide a thorough understanding of the disclosed subject matter. It may be evident, however, that the disclosed subject matter can be practiced without these specific details. In other instances, well-known structures and devices are shown in block diagram or schematic form in order to facilitate describing various aspects disclosed herein.

Reference throughout this specification to "one embodiment," "an embodiment," "a disclosed aspect," or "an aspect" means that a feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the features, structures, or characteristics may be combined in any suitable manner in various disclosed embodiments.

As utilized herein, terms "component," "system," "module", "interface," "user interface", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

Since the advent of network-based computer services, challenges involved in delivering network services to a dynamic population of devices have been a driving motive of new technology. For instance, each network access point whether wired or wireless has a finite amount of network resources to allocate to devices. Ideally, as many devices as attempt to access a network will be served by a network access point. However, because it is possible to have more client device demand than network resources to serve the demand, a conflict can exist with this goal of provisioning service to every client device attempting access.

In addition to the foregoing, new online content paradigms involve some sort of elevated QoS, elevated performance, or the like, to facilitate adequate consumer satisfaction. For instance, high quality voice over Internet protocol (VoIP) can involve elevated QoS related to continuity of audio communications, low jitter, noise reduction or signal clarity, to achieve sufficient consumer satisfaction. Likewise, streaming media services such as streaming movies or video conferencing can involve elevated performance in terms of sufficient bandwidth or data rates to convey high resolution video and audio, audio/video continuity to meet playback or participant expectations, and the like. Thus, as services become more complex, the technology for delivery of these services tends to become more demanding.

In many instances, the goal of serving all devices will conflict with the goal of meeting high demand services. Some attempts to address this conflict exist or have been theorized. For example, best effort traffic is a mechanism for giving service to as many subscribers as possible, with the resources available. However, the best effort traffic model can result in loss of service when available resources are insufficient to support the service. The guaranteed bit rate (GBR) model is intended in part to address this problem with the best effort traffic model. The GBR model allocates an amount of resources sufficient to provide a predetermined bit rate at the client device. This allocation is provided to subscribers in response to initiation of an application on a client device. However, where poor network conditions exist between a network access point and the client device, far greater access point resources can be required to deliver the predetermined bit rate to the client. This can cause several problems, ranging from dropped service for existing devices, network inaccessibility for new devices, or loss of the GBR service.

Aspects of the subject disclosure provide for allocating network communication resources based on status of an application operating on a client device of a network. Client application status can be inferred or determined from one or more methods. In some aspects of the disclosure, analysis of application-related traffic can be utilized to infer a status of one or more client applications. In other aspects, an online content server delivering content or services (referred to collectively as online content, application content, or content) for a client application can provide the status of a client application. In still other aspects, a client application or the client device can report the status of the client application. Once obtained, status of the client application can be utilized as a basis for allocating application-specific network resources for respective applications of the client device. Allocation of network resources in such a fashion can serve to improve acquisition and playback of content by the client application at the client device, improving user satisfaction of client applications.

Referring now to the drawings, FIG. 1 illustrates a block diagram of an example system 100 for providing application-specific resource allocation for devices communicatively connected to a communication network. In some embodiments, system 100 can employ a wired communication interface between devices and the communication network. In other embodiments, system 100 can employ a wireless communication interface between devices and the communication network. In still other embodiments, system 100 can employ a communication interface having wired and wireless components.

System 100 can comprise one or more network access points 104 communicatively connected to a population of devices 106 via a client/network interface 102. As mentioned above, client/network interface 102 can comprise a wired interface, wireless interface, or an interface having wired and wireless components. Network access point(s) 104 can include Internet service provider equipment, a router, a network access server, a base station of a cellular network, or the like, or a suitable combination thereof.

Network access point(s) 104 can comprise or be communicatively connected to a resource and state analysis component 108. Resource and state analysis component 108 can be configured to identify a status of an application (e.g., a network content client application, such as an Internet browser, streaming movie player, audio player, voice communication service, audio/video communication service, and so forth) operating on one or more of population of devices 106. Moreover, resource and state analysis component 108 can be configured to utilize the identified status of the application, at least in part, as a basis for determining a suitable allocation of resources for the application. Other factors for determining the suitable allocation of resources can include current device loading and resource availability at network access point(s) 104, client subscription level, amount of resources being consumed by an associated one of population of devices 106, acceptance of term-limited increase in resource allocation (e.g., guaranteed bitrate for the duration of an online movie, . . . ), or the like, or a suitable combination thereof. Further, resource and state analysis component 108 can be configured to transmit a request to network access point(s) 104. The request can specify the allocation of resources determined by resource and state analysis component 108 to be suitable for the application, and request network access point (s) 104 to modify current resources of the one of population of devices 106, or of the application itself, to match the allocation of resources.

In additional aspect of the subject disclosure, resource and state analysis component 108 can be configured to identify the status of an application operating on one of population of devices 106 according to one of a set of mechanisms, or a combination of such mechanisms. One example mechanism can involve mining network traffic related to the one of population of devices 106 and analyzing application-specific characteristics of the network traffic. When changes in application-specific characteristics are identified matching a predetermined criterion, an inference can be drawn pertaining to the status of the application. As one example, when a datarate of network traffic for a client application exceeds a predetermined datarate, is changed by a predetermined degree, or the like, or a suitable combination thereof, the inference can be drawn. One example of a suitable inference can be identification of a status of the client application. A set of suitable application statuses can include active status (e.g., executing on a client device and consuming device resources), inactive status (e.g., executing on the client device but consuming minimal or no device resources), minimized status (e.g., not output to a display), displayed status (e.g., presented in the background or foregoing of a display), maximized status (e.g., displayed in an entire foreground of a display), or the like, or a suitable combination thereof. Thus, as one detailed example, when a datarate of application-specific network traffic associated with the particular application exceeds the predetermined datarate, the status of the particular application can be inferred to be one (or more) of a set of states (e.g., active status).

According to further disclosed aspects, resource and state analysis component 108 can be configured to receive and decode a transmission identifying the status of the application, or providing information relevant to identifying the status of the application. In one such aspect, the transmission could be transmitted by one of population of devices 106, providing the information. In another such aspect, the transmission could be transmitted by a content provisioning entity (e.g., a conference calling server, a streaming media server, a voice over internet protocol server, and so forth). In yet another aspect, multiple transmissions—including one or more transmissions from population of devices 106 or one or more transmissions from content provisioning entity(ies)—can be decoded to derive information relevant to identifying the status of the application.

In one or more disclosed embodiments, resource and state analysis component 108 can comprise a client-side application monitoring component 110, a service-side resource monitoring component 112 and a resource management component 114. Client-side application monitoring component 110 can be configured to monitor client-side communications activity pertaining to client/network interface 102. Network traffic of respective ones of population of devices 106 can be parsed, and further, client-side application monitoring component 110 can be configured to identify respective streams of traffic within a given client device's network traffic that are associated with respective applications operating on the client device. In some embodiments, client-side monitoring component 110 can be configured to estimate communication resource demand of one or more applications. Resource demand can be determined, for instance, based on an inference from application-specific network activity in an associated stream(s) of traffic, based on an explicit request for more or less (or a specified amount of) network resources, or a different resource characteristic (e.g., guaranteed bitrate), or the like. Communication resource demand can be forwarded to resource management component 114. In at least one embodiment, client-side application monitoring component 112 can be configured to identify a status of an application operating on a client device from analysis of application-specific characteristics of a stream(s) of traffic associated with the application.

Service-side resource monitoring component 112 can be configured to track network activity pertaining to client/network interface 102. The network activity can include transmissions from network access points(s) 104 to population of devices 106, as well as transmissions received at network access point(s) 104 from population of devices 106. Additionally, service-side monitoring component 112 can be configured to monitor application-specific traffic from a network service provider(s) (not depicted) received at network access point(s) 104 or another suitable network-side entity (e.g., a core network, a network trunk, a network router or multiplexer, or the like). Service-side monitoring component 112 can be further configured to track network resource availability of a service network (e.g., including network access point(s) 104) that provides network access services for population of devices 106. Network resource availability can be provided to resource management component 114.

Resource management component 114 can be configured to compare resource demand of an application operating one of population of devices 106 with a metric of resource availability of a service network serving population of devices 106. The resource availability can pertain to resources of network access point(s) 104, but might also include backhaul resources, core network resources, or some other suitable finite service-side communication-related resource. Further to the above, resource management component 114 can be configured to request modification of an allocation of service network resources for the application. Specifics of the modification (e.g., increase or decrease in resources, whether to redirect resources and from where, whether to allocate unallocated resources, whether to guarantee a level of resources at a client device (e.g., a guaranteed bitrate, a guaranteed bandwidth, . . . ), or the like, or a suitable combination thereof, can be stored in a set of allocation rules 118 in a data store 116. Allocation rules 118 can establish one or more criterion for determining whether or how to modify the allocation of service network resources. In some embodiments, the modification can be in response to a determination that the status of the application meets a predetermined criterion (e.g., is in an active status, whether maximized, or currently responsive to user input or commands, or other suitable determining characteristic(s) of active-status application). In alternative or additional embodiments, the modification can be in response to a determination that the resource demand satisfies a function with respect to resources currently allocated to the application. The function could incorporate a subscription level of the application, or an associated client device, establishing a first resource allocation. The function could incorporate current resource availability or device loading of network access point(s) 104 in another embodiment, which could modify the first resource allocation. The function could incorporate a service provider request for resources to deliver a resource, which could modify the first resource allocation in another embodiment. Further, the function could incorporate a term-limited agreement to increase, or guarantee resources (modifying the first allocation if suitable) based on satisfaction of a condition at one of population of devices 106 (e.g., payment of a term-limited fee, playback of a sponsored advertisement at the client device—coupled with billing a sponsor for payment related to the advertisement, and so on). Other criterion related to determining whether to modify allocation of resources and how to modify resources can be incorporated into the function, which also could be stored in allocation rules 118 as well.

Network access point(s) 104 can receive a request for modifying an allocation of resources to a client device, and implement the request. Thus, application related stream(s) of traffic/content 120 can be delivered to population of devices 106 with the modified allocation of resources. Thus, based at least in part on status of an application, network resources can be managed to optimize network content delivery for that application. As one example, if a first application has a minimized status and a second application has an active status, network resources can be re-allocated from the first application to the second application. This can improve user experience of online content, by providing suitable network resources to an application (e.g., an active application) currently viewed or utilized by a user of a client device. If the first application is again determined to be the active application, resources can be re-allocated to meet demand of the first application. Accordingly, system 100 can be configured to monitor application state of applications operating on population of devices 106, and modify application-specific resource allocations to improve network performance of applications based on respective application states, according to predetermined resource allocation and application state rules.

Figure 2:
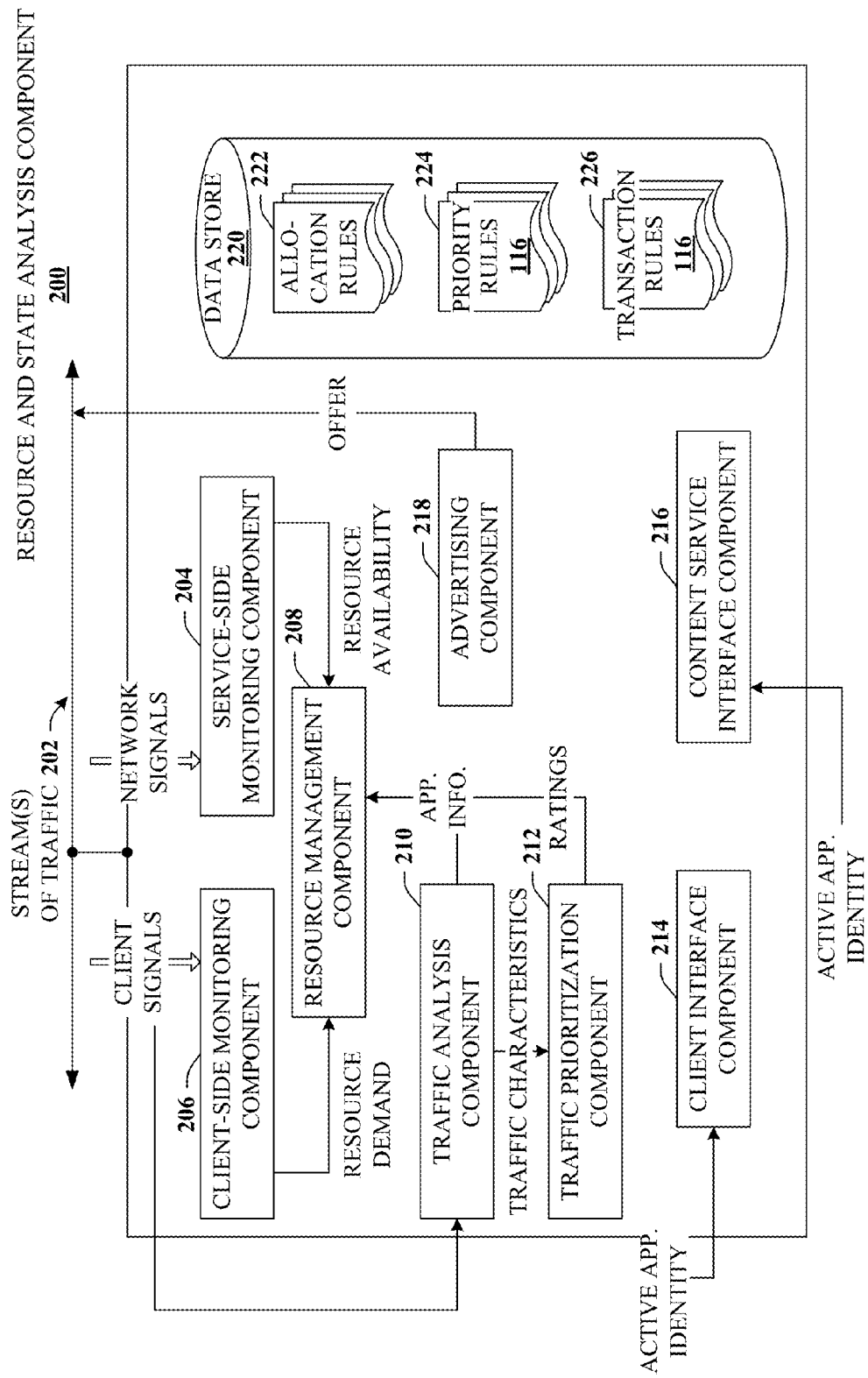
FIG. 2 depicts a block diagram of a sample system that facilitates priority-based resource allocation for client application according to disclosed aspects.

FIG. 2 illustrates a block diagram of an example resource and state analysis component 200 for facilitating provision of communication resources as a function of application state according to additional aspects of the subject disclosure. In some embodiments, communication resources can be provided on an application-by-application basis to applications operating on a client device. In one or more embodiments, respective resources, amounts of resources, type of resources, or the like, can be selected for respective applications at least in part based on a state of respective ones of the applications. Applications state can be determined from application-specific network traffic information, via a report from a client device or client application, via a report from a service provider associated with the client application, or the like, or a suitable combination thereof.

Resource and state analysis component 200 can comprise a service-side resource monitoring component 204 and a client-side application monitoring component 206 configured to analyze one or more streams of traffic 202 related to one or more client applications served by a network. Service-side resource monitoring component 204 can be configured to track network-side traffic associated with one or more client applications, and client-side application monitoring component 206 can be configured to track client-side traffic associated with the client application(s). In at least one embodiment, service-side resource monitoring component 204 can be configured to track or determine availability of communication resources of the network, and client-side application monitoring component 206 can be configured to identify a status of one or more clients of a network (e.g., client application, client device, etc.). A resource management component 208 can be configured to receive client application status or related information (e.g., resource demand) and a metric of resource availability of the network, and determine whether to modify an allocation of communication resources to the application. The determination of whether to modify the allocation of communication resources can be conditioned on one or more conditions established by a set of allocation rules stored in an allocation rules file 222 at a data store 220. The set of allocation rules can further store one or more parameters related to identifying a suitable amount or type of resources to allocate to the client application, if a condition(s) for modifying the communication resources is met. The modification can be at least in part based on a set of priority rules stored in a priority rules file 224 associated with priority of one or more client applications, or a metric of resource demand associated with the client application, as described in more detail below.

Resource management component 208 can be configured to acquire information related to demand of a client application and resources of a network from components of resource and state analysis component 200. In addition, resource management component 208 can be configured to reference allocation rules file 222 to identify circumstances for which an allocation of communication resources to the client application should be changed. Examples of such circumstances can include an explicit request—e.g., from the client application or from a service provider entity provisioning online content for the client application—or can be inferred from traffic data pertaining to the client application. In the latter case, client-side monitoring component 206 can be configured to identify changes in demand for a client application (e.g., by identifying a change in traffic pertaining to the client application satisfying a traffic—demand correlation function, or the like) and forward the identified changes to resource management component 208.

When an increase in demand is obtained by resource management component 208, allocation rules file 222 can be referenced to determine what action to take. Examples of suitable actions specified by allocation rules file 222 can include, but are not limited to, the following examples. As a first example, where suitable network resources exist to satisfy the demand, an increased allocation of communication resources can be provided to the client application. An amount or type of the communication resources can be specified by allocation rules 222. In one embodiment, the amount or type can be specified to be that which is suitable to the demand. In another embodiment, the amount or type of resources can be specified differently according to different levels of a subscription account associated with the client application.

A second example of a suitable action in response to an increase in client application demand (e.g., where sufficient network resources are not available to allocate to the client application), is to employ network resource arbitrage among clients of a network or of a service provider. For instance, resource management component 208 can attempt to arbitrage network resources among devices served by the network, and increase an allocation to the client application while decreasing an allocation of resources from one or more other devices. In another aspect(s), resource management component 208 can arbitrage network resources among applications operating on a particular client device, decreasing network resources for a second client application to increase network resources to the client application. In yet another aspect(s), resource management component 208 can arbitrage network resources from one or more other devices or one or more other client applications, and increase allocated resources to the client application.

Arbitrage of network resources, including whether to increase an allocation of resources and where to pull those resources from, can be based one a set of factors stored in allocation rules file 222. In some aspects of the subject disclosure, the set of factors can include a priority rating attributed to the client application or associated traffic, and optionally respective priority ratings of other client applications or devices. Priority ratings can be stored and utilized as specified by priority rules file 224 (e.g., a guaranteed bitrate for a high priority application or high priority traffic, arbitrage from lower priority applications or clients to a higher priority application, or the like). In some embodiments, a priority level of a client application or device can be based at least in part on a subscription level or account level associated with the client application or device. In alternative or additional embodiments, the priority level can be established at least in part on a type of traffic being employed by a client application or device (e.g., voice traffic having a first priority level, browsing traffic having a second priority level, streaming media traffic having a third priority level, etc.). The subject disclosure is not limited to the prior conditions for the priority level, however, and like known in the art or known to one of ordinary skill in the art by way of the context provided herein, or suitable combinations of the foregoing, are considered within the scope of the subject disclosure. In addition to the foregoing, in various embodiments, a higher priority level can be provided for a limited time in response to completion of a transaction. Examples of such as a transaction can include, playback of an advertisement (e.g., see below) at a media device of a client device, payment of a fee, or the like. Transactions and mechanisms for implementing them can be stored in a set of transaction rules stored in a transaction rules file 226 of data store 220.

A third example of a suitable action in response to an increase in client application demand can be to offer a transaction for guaranteed communication resources for a limited time. The limited time can be, for instance, a playback duration of a media file, a block of time coupled with usage of a service (e.g., second, minute, hour, . . . , increments of an online voice or voice and video service), a block of time independent of service, or the like. The transaction can be offered via an advertising component 218 configured to transmit a message to a client device in response to the increase in client application demand, comprising details of the transaction. In various embodiments, the transaction can involve allocation of the guaranteed communication resources for the limited time in response to a purchase, playback of an advertisement on a media player of an associated client device, and so forth. Where network resources are not suitable to meet client application demand and the client application rejects the offered transaction, resource management component 208 can offer best-effort traffic, or indicate the service is unavailable for a limited time, or the like.

Service-side resource monitoring component 204 can be configured to track network transmissions to the client application(s) from the network, or from a service provider communicating through the network, whereas client-side application monitoring component 206 can be configured to track client transmissions to the network related to network content; however the subject disclosure is not so limited, and other configurations can be employed in addition or as an alternative. For instance, service-side resource monitoring component 204 can track transmitted and received communications related to the client application(s) on the network side, and client-side application monitoring component 206 can track transmitted and received communications related to the client application(s) from the client side (e.g., as received or transmitted by a network access point). In at least some disclosed embodiments, client-side application monitoring component 206 can additionally be configured to determine a state of the client application(s) from traffic transmitted to or received from the client application (originated at network or client side), and resource and state analysis component 200 can facilitate provisioning of network resources to the client application(s) based at least in part on the state of the client application(s).

In one or more aspects of the subject disclosure, client-side application monitoring component 206 can be configured to provide a state or status of a client application (referred to hereinafter as client application status, or status of the client application(s)) from stream(s) of traffic 202 related to the client application. The client application status can be inferred from an amount of network traffic related to the client application, in some aspects. In other aspects, the client application status can be inferred from a relative amount of network traffic related to the client application (e.g., a number of packets transmitted to the client application compared with respective numbers of packets transmitted to other applications operating on an associated client device). In one or more other aspects, the client application status can be inferred from a request for increased network resources to a network. In still other aspects, similar traffic-based criteria can be employed to infer the client application status, or a combination thereof. In at least one aspect, a client interface component 214 can be configured to receive an explicit indication from a client application or client device indicative of the client application status. The explicit indication can, for instance, be transmitted by the client device or client application explicitly identifying the client application status. In another example, the explicit indication can be extracted by a traffic analysis component (e.g., traffic analysis component 210) that monitors service-side network activity and identifies traffic within stream(s) of traffic 202 indicative of the client application status. In at least one additional aspect of the subject disclosure, resource and state analysis component 200 can comprise a content service interface component 216 configured to receive a transmission from a network content provider indicative of the status of the client application.

According to further disclosed embodiments, analysis of streams of traffic 202 can be facilitated by a traffic analysis component 210. Traffic analysis component 210 can be configured to access stream(s) of traffic 202 and inspect data packets of stream(s) of traffic 202, and identify one or more data streams transmitted to or received from a client device. In some aspects, traffic analysis component 210 can be configured to identify one or more streams of traffic 202 associated with respective client applications operating on the client device. In some disclosed embodiments, traffic analysis component 210 can be configured to have alternative or additional features to those stated above. For instance, in at least one embodiment, traffic analysis component 210 can be configured to identify a category of application traffic associated with at least one client application. Traffic can be categorized as a function of encoding (e.g., audio encoding, video encoding, etc.), traffic characteristics (e.g., steady bitrates, bursty bitrates, and so on), or other suitable traffic characteristic. Specific categories of traffic can include, but are not limited to, data traffic, video traffic, audio traffic, voice traffic, audio-video traffic, video-voice traffic, or the like, or a suitable combination of the foregoing. Traffic categorization data can be forwarded to resource management component 208 to facilitate determining a suitable allocation of communication resources for a client application (e.g., where traffic categorization is a permitted parameter of the allocation rules stored in allocation rules file 222). In a further embodiment(s), traffic categorization data can be provided by traffic analysis component 210 to a traffic prioritization component 212. Traffic prioritization component 212 can be configured to assign a respective priority rating to respective categories of application traffic based on a set of priority rules stored in a priority rules file 224 of data store 220. Priority ratings can be provided to a resource management component 208 to further facilitate determining the suitable allocation of communication resources for the client application (e.g., where traffic priority rating is a permitted parameter of the allocation rules stored in allocation rules file 222).

In at least one aspect of the subject disclosure, client application status can be specified via an explicit indicator. The explicit indicator can be received from the client application or a client device operating the client application, in one such aspect. The explicit indicator from the client application/device can be received at a client interface component 214 configured to receive client application/device transmissions. In another aspect, the explicit indicator can be received from a service operation entity providing online content for the client application/device. In the latter aspect, the explicit indicator can be received at a content service interface component 216 configured to transmit data to, or receive data from, the service operation entity. Information related to a client application status can be forwarded by client interface component 214 or content service interface component 216, where suitable, to client-side monitoring component to facilitate determination of the client application status.

The client application status, once determined, can be forwarded to resource management component 208. Further to that described above, resource management component 208 can be configured to facilitate allocation of network resources for the client application(s) at least in part based on the client application status according to rules for allocating resources (e.g., as specified by allocation rules file 222). In the context of client application status, allocation rules information can specify an amount, type, quality, etc., of network resources to allocate to the client application. Furthermore, the allocation rules information can include different categories of resources to be allocated to client applications meeting one or more criteria related to client application status. Examples of suitable client application status criteria can include whether the client application is active on a client device, minimized or maximized on a display, displayed (but not maximized) on the display device, or the like. Another suitable criterion can include availability of network resources to be allocated to a client application (e.g., access point(s) resources, backhaul resources, core network resources, etc.) having a given client application status. Resource availability can be received from service-side resource monitoring component 204, in as described herein. Another example criterion can include a network subscription level of a client device on which the client application operates. Yet another example criterion can include subscription level of a client application with a content provider (e.g., a subscription level for a video on-demand content provider and corresponding video on demand client application on a client device). These or similar criteria, or suitable combinations thereof, can be employed by allocation rules file 222 for establishing the type, amount, quality, etc., of network resources to be applied to a client application at a given instance.

Figure 3:
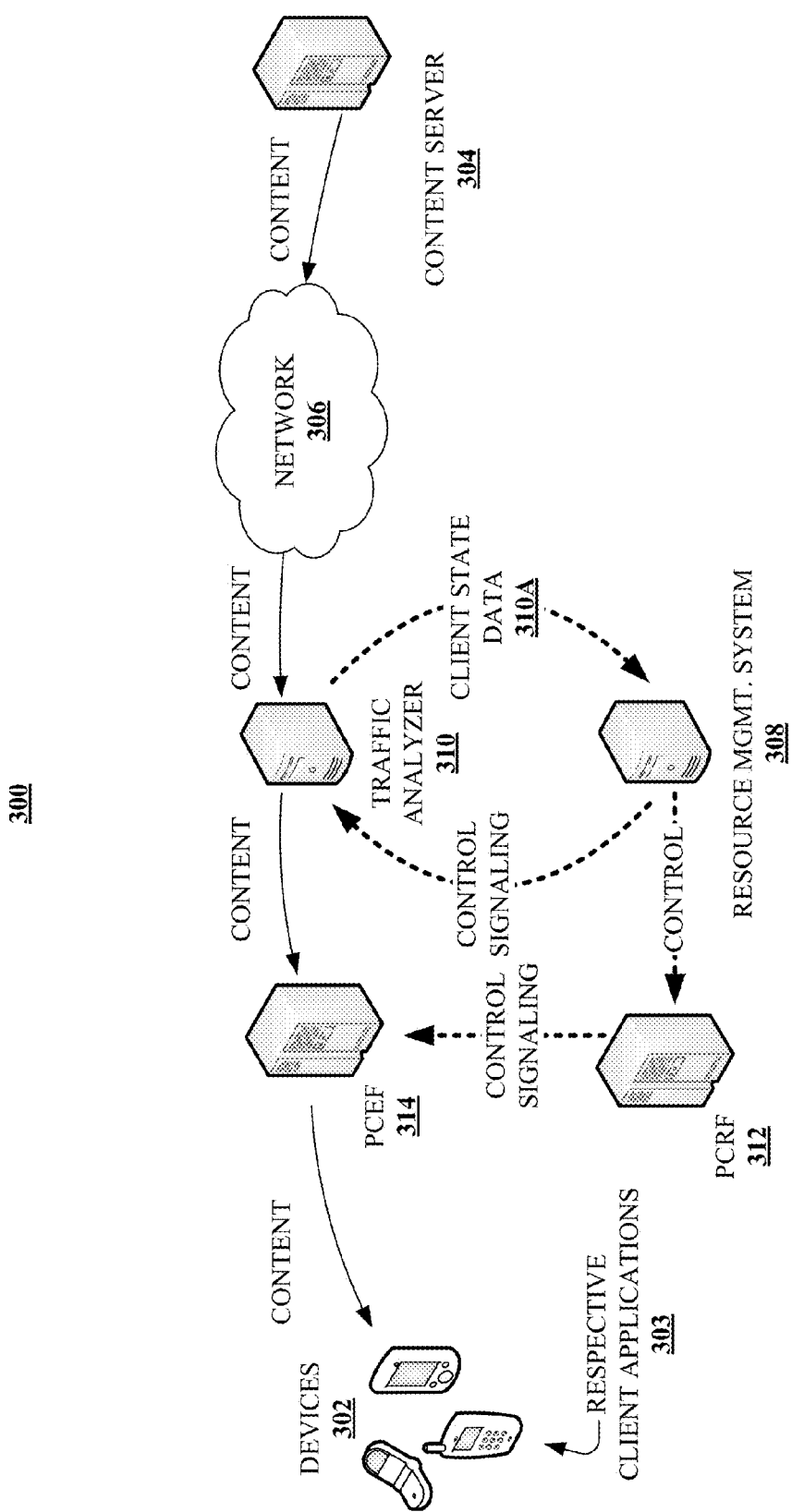
FIG. 3 depicts a block diagram of an example system for network-directed inference of client application status according to some embodiments.

FIG. 3 is a block diagram of an example network system 300 for facilitating determination of client application status, according to one or more embodiments. For instance, network system 300 can comprise inferring a client application status through traffic analysis metrics for one or more streams of traffic associated with a client application. The traffic analysis metrics, or the client application status derived there from, can be forwarded to a management system configured to modify allocation of communication resources to the client application based at least in part on the client application status. In at least some aspects of the subject disclosure, determination of the client application status can be real-time, or concurrent with changes in client application status. Thus, network system 300 can facilitate an improved responsiveness to client demand and an adaptive system of network resource allocation to service changing identified changes in client demand (e.g., based on identified changes in client application status).

Network system 300 can comprise one or more devices 302. In addition, respective ones of devices 302 can have respective client applications 303 operating thereon. Client applications 303 can be registered with one or more content servers 304 based on a subscription account. The subscription account can provide predetermine online content or services in exchange for some revenue, advertisement, or return service, or the like. In at least one embodiment, the subscription account can further stipulate a degree, amount, etc., of network communication resources to be provided by an access network (e.g., cellular network, Wi-Fi network, Internet Service Provider [ISP], . . . ) in conjunction with providing the online content or services to respective client applications 303. Accordingly, when requesting content under the subscription account, respective client applications 303 can expect to receive network communication services commensurate with the degree, amount, etc., of network communication resources stipulated by the subscription account.

Upon requesting content, content server 304 can transmit the content over a network 306 (e.g., the Internet, a wide area network, local area network, a web, an intra-web, and so forth) to one of respective client applications 303 initiating the content request, as indicated by the solid arrows. The content can, in at least one embodiment of network system 300, be routed through a traffic analyzer 310 and one or more network components, and in an alternative or additional embodiment, the content can by accessed or monitored by the traffic analyzer 310 and one or more network components. In some embodiments, the one or more network components can comprise a network management component 314 that facilitates enforcement of subscription account parameters in conjunction with provisioning of online content for respective client applications 303. In at least one embodiment, network management component 314 can be configured establish basic network resources (e.g., bandwidth, data rate, . . . ), exhibiting predetermined quality characteristics (e.g., jitter, packet loss, . . . ) for general connectivity (e.g., indefinite duration, . . . ) or for specific connectivity (e.g., having a specified duration—for instance a duration of an instance of an online service, etc.), or the like, or a suitable combination thereof. In alternative or additional embodiments, network component 314 can be configured to track content consumed under such subscription account for charging functionality. One example of such a network component is a policy charging and enforcement function (PCEF) of network component 314, though the subject disclosure is not limited to this example.

Traffic analyzer 310 can be configured to monitor one or more streams of traffic related to devices 302 or respective client applications 303. The stream(s) of traffic can originate from network 306 and be directed to devices 302 (or respective client applications 303) in some aspects. In other aspects, the stream(s) of traffic can originate at respective client applications 303 and be directed to network 306 (or content server 304). In still other aspects, traffic analyzer 310 can be configured to monitor streams of traffic transmitted from network 306 (or content server 304) to respective client applications 303 in addition to streams of traffic transmitted by respective client applications 303 to network 306 (or content server 304).

Further, traffic analyzer 310 can be configured to infer information pertaining to a state of one of respective client applications. The inference can be drawn at least in part based on statistics pertaining to traffic within the stream(s) of traffic monitored by traffic analyzer 310. For instance, traffic analyzer 310 can be configured to identify an amount, a type, or a change in the amount or type of traffic in a stream(s) of traffic related to respective client applications 303, and infer information pertaining to a state of one of respective client applications 303 at least in part based on this identified information. The inference can be drawn, in various disclosed embodiments, by extracting one or more metrics of the stream(s) of traffic and inserting the metric(s) into a suitable function that correlates traffic statistics with client application state. If the function is satisfied with respect to one of a set of client application states, traffic analyzer 310 can infer that the client application state characterizes one of the respective client applications 303.

Client application state data 310A can be forwarded by traffic analyzer 310 to a resource management system 308. Resource management system 308 can be configured to compare the client application state data 310A to stored communication resource information, and identify a suitable allocation of communication resources matching the client application state data. The suitable allocation of communication resources can be compared to existing communication resources (if any) allocated to one of respective client applications 303 to which the client application state data 310A pertains. Resource management system 308 can be configured to then determine whether the existing communication resources meet the suitable allocation of communication resources. If so, no change in resource allocation is required in response to the client application state data 310A. On the other hand, in response to existing communication resources not meeting the suitable allocation of communication resources, resource management system 308 can proceed to acquire a metric of resource availability from a network serving one of devices 302 operating the one of respective client applications 303. Resource management system 308 can be configured to instruct a network component 312 via control signaling (dotted arrows) to provide the suitable allocation of communication resources for the respective client application 303 in response to the resource availability being sufficient for the suitable allocation of communication resources. The suitable allocation of communication resources could be provided at an additional cost, in response to playback of an advertisement or other media application on an associated one of devices 302, or at no cost, or for another suitable compensation. Otherwise, in response to the resource availability being insufficient for the suitable allocation of communication resources, resource management system 308 can be configured to perform one or more of a set of actions. According to one or more embodiments, the set of actions can include instituting a resource arbitrage, whereby resources are decreased from another of respective client applications 303 or from another of devices 302 and increased for the one of respective client applications 303. In another embodiment, the set of actions can include offering the suitable allocation of communication resources for a limited duration in response to completion of a transaction (e.g., a purchase, playback of an advertisement, . . . ). In response to completion of the transaction, resource management system 308 can implement the resource arbitrage for the one of respective client applications 303. In yet another embodiment, the set of actions can include offering best effort only communication resources, and sending a warning to the one of respective client applications 303 that playback of content may be suboptimal. In an additional embodiment, the set of actions can include sending a message that the content or service is presently unavailable, whereupon resource management system 308 does not implement a modification of the allocation of communication resources for the one of respective client applications 303.

Network component 312 can instruct a network serving the one of respective client applications 303 to modify an allocation of communication resources to the one of respective client applications 303. The modified allocation of communication resources is consistent with modified resources indicated by resource management system 308. The modified communication resources can be maintained indefinitely, or for a limited time, as specified by resource management system 308. In at least one embodiment, network component 312 can be a policy and charging rule function (PCRF), although the subject disclosure is not limited to this embodiment(s).

Figure 4:
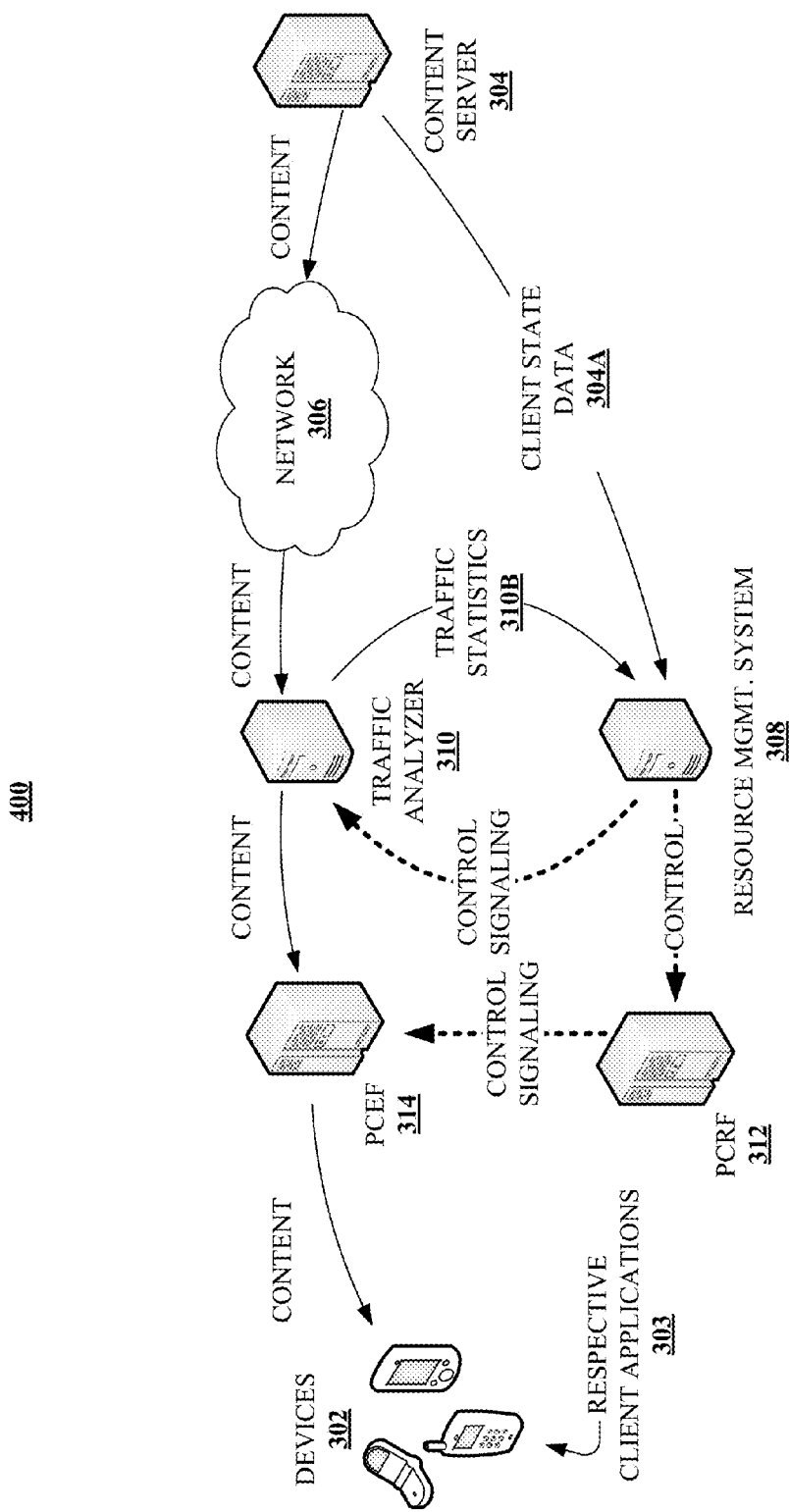
FIG. 4 illustrates a block diagram of a sample system for service-directed determination of client application status in another embodiment(s).

FIG. 4 illustrates a block diagram of an example network system 400 for facilitating determination of client application status, according to alternative or additional embodiments. Network system 400 can at least in part be substantially similar to network system 300 in some embodiments. For instance, components of network system 400, including devices 302, respective client applications 303, content server 304, network 306, resource management system 308, traffic analyzer 310, PCRF 312 and PCEF 314 can be substantially similar to corresponding components of network system 300 for at least a subset of function of the respective components.

In various embodiments, content server 304 can be configured to identify a state of one of respective client applications 303. Client application state data 304A can be forwarded from content server 304 to resource management system 308, to facilitate modification of an allocation of communication resources for the one of respective client applications 303 as described herein. The modified allocation of communication resources can be determined by resource management system 308 at least in part based on the client application state data 304A. In at least one embodiment, resource management system 308 can also employ traffic statistics 310B provided by traffic analyzer 310 to determine the modified allocation of communication resources. Traffic statistics 310B can identify packet sizes, amounts of data, data rates, bandwidth, quality of service specifications or the like being transmitted between the one of respective client applications 303 and content server 304. Thus, for instance, where actual traffic statistics meet the modified allocation of communication resources, the modification can be delayed until actual traffic statistics drop below the modified allocation of communication resources. To implement the modification, resource management system 308 can employ control signaling (dotted arrows) to instruct PCRF 312 to modify communication resources allocated to the one of respective client applications via PCEF 314, in some disclosed embodiments. Network system 400, therefore, can provide communication resources to the one of respective client applications 303 sufficient to service content transmitted by content server 304, and modify the communication resources in response to changes in actual traffic statistics between respective client applications 303 and content server 304.

Figure 5:
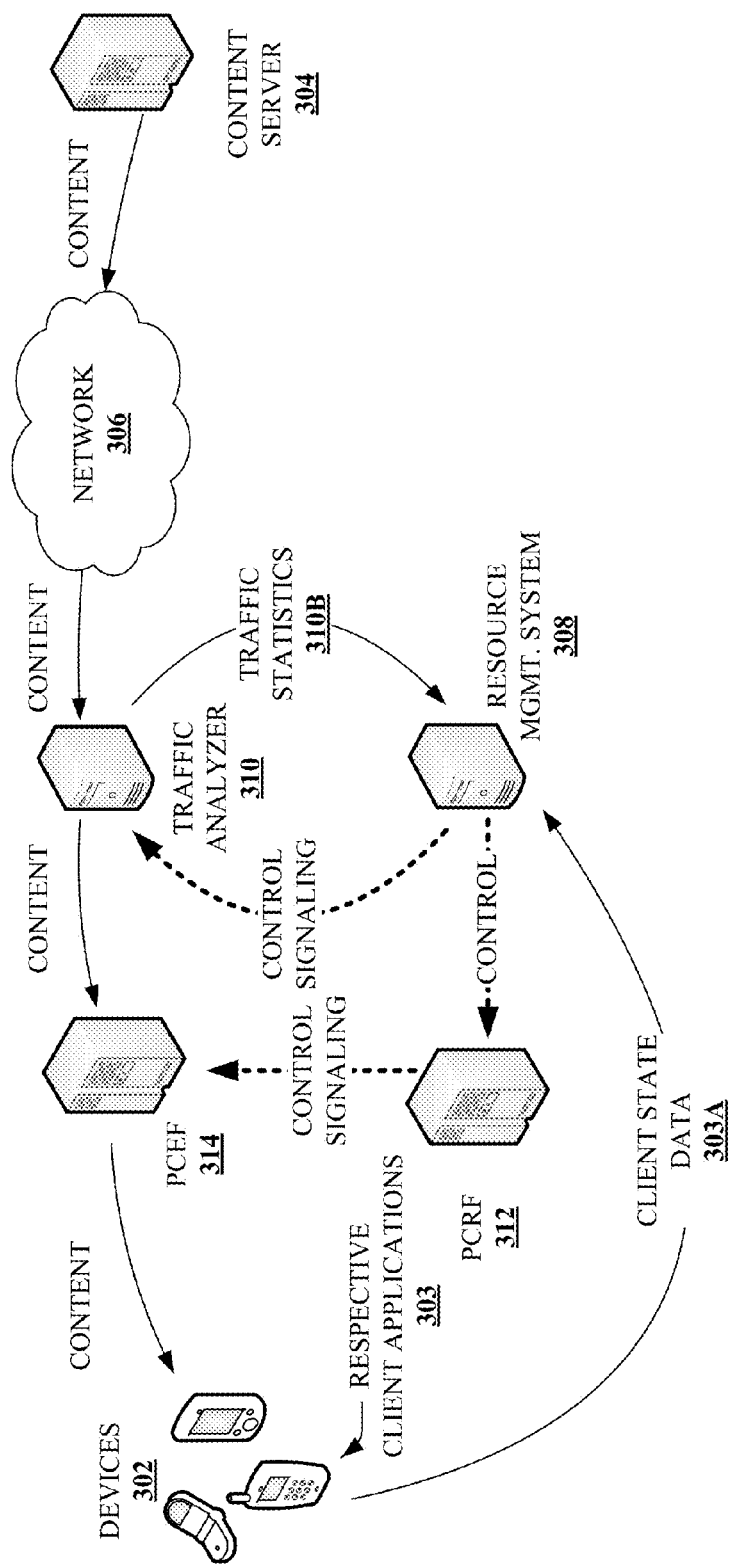
FIG. 5 depicts a block diagram of an example system for client reporting of client application status in one or more other embodiments.

FIG. 5 illustrates a block diagram of an example network system 500 for facilitating determination of client application status, according to alternative or additional embodiments. Network system 500 can at least in part be substantially similar to network system 300 in some embodiments. For instance, components of network system 500, including devices 302, respective client applications 303, content server 304, network 306, resource management system 308, traffic analyzer 310, PCRF 312 and PCEF 314 can be substantially similar to corresponding components of network system 300 for at least a subset of function of the respective components.

In various embodiments, respective client applications 303 can be configured to transmit a message comprising client application state data 303A of one of respective client applications 303. Client application state data 303A can be transmitted to resource management system 308, which can be configured to employ the client application state data 303A to modify an allocation of communication resources for the one of respective client applications 303 transmitting the client application state data 303A. The modified allocation of communication resources can be determined by resource management system 308 at least in part based on the client application state data 304A. In at least one embodiment, resource management system 308 can also employ traffic statistics 310B provided by traffic analyzer 310 to determine the modified allocation of communication resources (e.g., similar to that described with respect to network system 400, supra). To implement the modification, resource management system 308 can employ control signaling (dotted arrows) to instruct PCRF 312 to modify communication resources allocated to the one of respective client applications via PCEF 314, in some disclosed embodiments. Network system 500, therefore, can employ an explicit client application state to provide communication resources to a client applications providing the explicit client application state.

Figure 6:
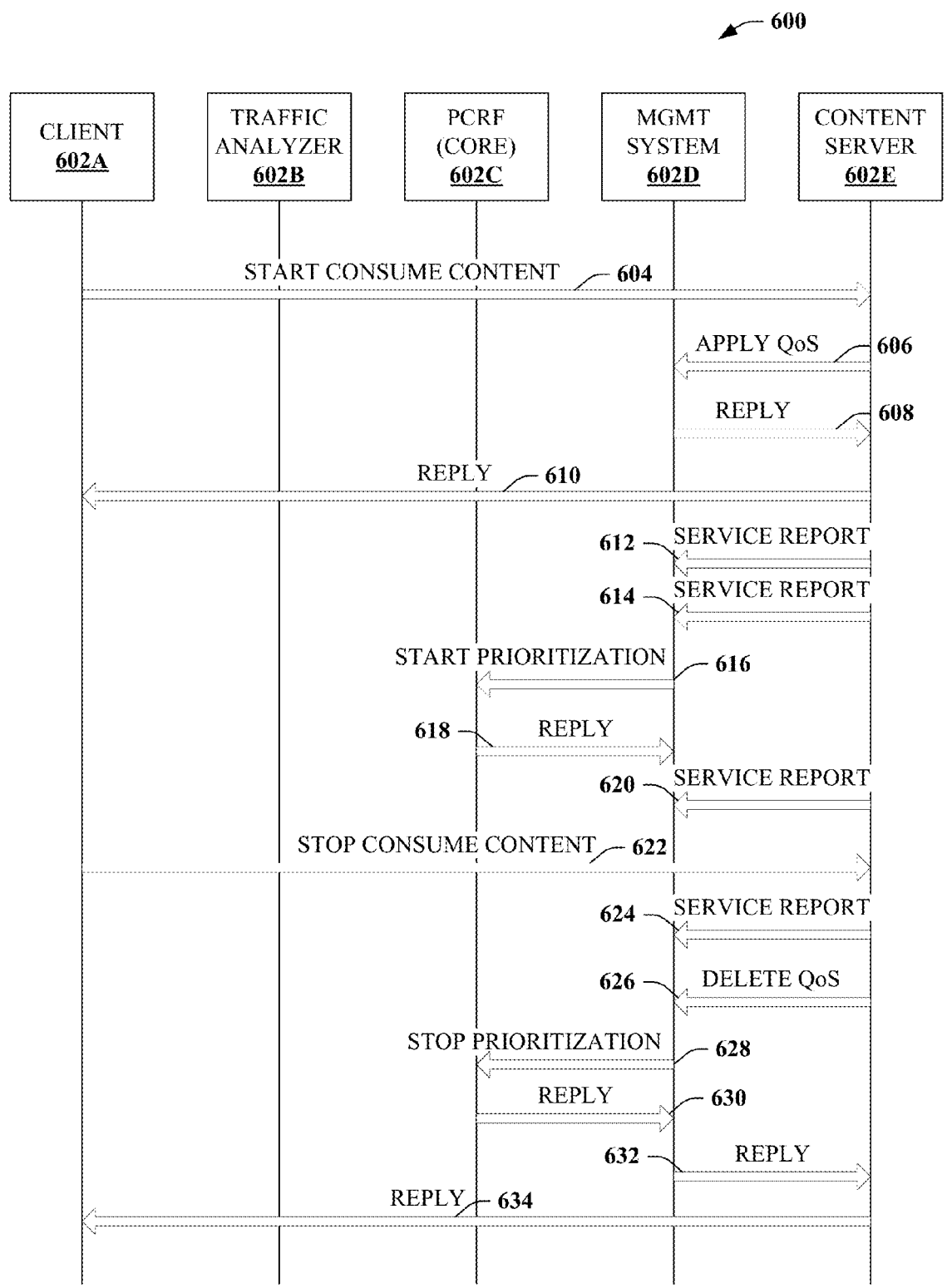
FIG. 6 depicts a diagram of an example network communication flow for service-directed application status reporting.

FIG. 6 illustrates a block diagram of an example network communication 600 facilitating reporting of client application state according to one or more disclosed embodiments. Network communication can comprise the following network components or network participants: client application 602A, traffic analyzer 602B, PCRF (core network) 602C, resource management system 602D and content server 602E. At 604, client application 602A starts consumption of content from content server 602E. At 606, content server 606 requests resource management system 602D to apply quality of service (QoS) parameters for client application 602A in conjunction with consumption of the content. At 608, resource management system 602D can transmit a reply to content server 602E, acknowledging or rejecting the application of the QoS parameters for client application 602A. At 610, content server 602E submits a reply to client application 602A indicating success or failure of the application of the QoS parameters.

At 612, content server 602E can transmit a service report to resource management system. According to various embodiments, the service report can include data pertaining to a state of client application 602A. The state can include whether client application 602A is active, inactive, minimized, maximized, currently displayed, currently responding to user commands, or the like, or a suitable combination thereof. At 614, a subsequent service report can be transmitted to resource management system 602D, comprising updated data pertaining to the state of client application 602A, if any (e.g., reporting any change in client application state). At 616, resource management system 616 can transmit a message to PCRF 602C instructing the QoS parameters to be applied to traffic between content server 602E and client application 602A. At 618, PCRF 602C can reply indicating success or failure of the application of the QoS parameters to such traffic. At 620, content server 602E can transmit a subsequent service report to resource management system 602D, comprising updated data pertaining to the state of client application 602A, if any.

At 622, client application 602A stops consuming the content and transmits a message to this effect to content server 602E. At 624, content server 602E transmits a subsequent service report to resource management system 602D, including client application state data indicating termination of consumption of the content. At 626, content server 602E can transmit a delete QoS command to resource management system 602D. In response to the delete QoS command at 628, resource management system 602D can instruct PCRF 602C to stop the application of the QoS parameters for the traffic between content server 602E and client application 602A. At 630, PCRF 602C can transmit a reply to resource management component 602D indicating a result of stopping the application of the QoS parameters. At 632, resource management component 602D can transmit a reply to content server 602E indicating the result of stopping the application of the QoS parameters. At 634, content server 602E can transmit a reply to client application 602A acknowledging termination of consumption of the content.

Figure 7:
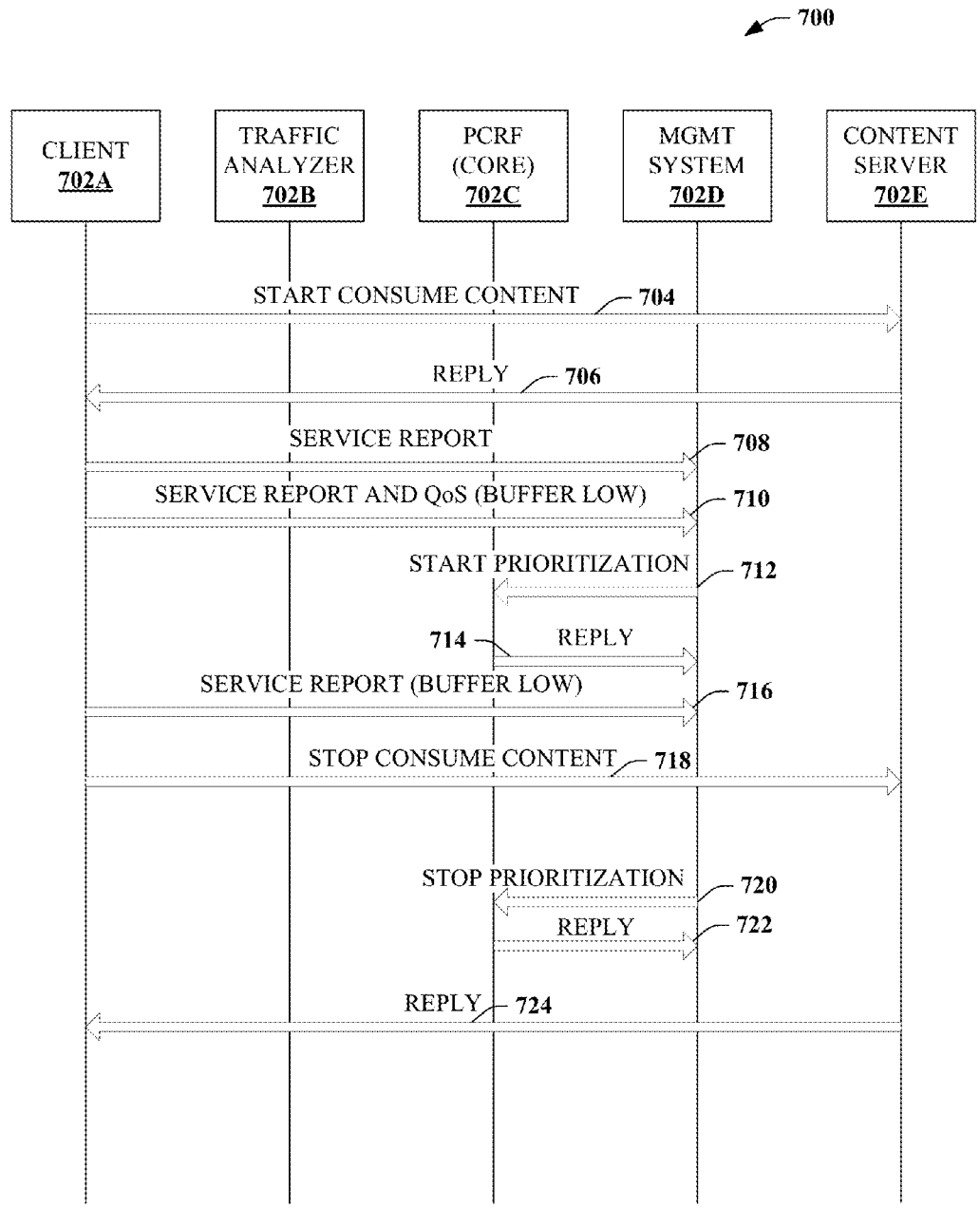
FIG. 7 depicts a diagram of a sample network communication flow for client-directed application status reporting.

FIG. 7 illustrates a block diagram of an example network communication 700 facilitating reporting of client application state according to one or more further embodiments. Network communication can comprise the following network components or network participants: client application 702A, traffic analyzer 702B, PCRF (core network) 702C, resource management system 702D and content server 702E. At 704, client application 702A transmits a message to content server 702E to start consuming content. At 706, content server 702E can transmit a reply to client application 702A in response to the message to start consuming content.

At 708, client application 702A can transmit a service report to resource management system 702D. The service report can include, for instance, client application state data pertaining to a state of client application 702A. At 710, client application 702A can transmit a low buffer service report to resource management system 702D which includes QoS parameters suitable to consumption of the content by client application 702A At 712, resource management system 702D can transmit a message to PCRF 702C instructing the QoS parameters to be applied to traffic between client application 702A and content server 702E. At 714, PCRF 702C can transmit a reply in response to the instruction, indicating success or failure of applying the QoS parameters to such traffic. Optionally, at 716, client application 702A can submit a follow-up low buffer service report to resource management system 702D, with new QoS parameters in response to a change in QoS parameter requirements of client application 702A, if any. Such new QoS parameters can optionally be implemented by resource management system 702D, where suitable.

At 718, client application 702A can transmit a message to content server 702E indicating that client application 702A has stopped consuming the content. At 720, resource management system 702D can stop application of the QoS parameters to the traffic between client application 702A and content server 702E. At 722, PCRF 702C can transmit a reply to resource management system 702D indicating a result of stopping the application of the QoS parameters to such traffic. At 724, content server 702E can transmit a reply to client application 702A acknowledging stopping of content consumption, and transmission of the content to client application 702A.

Figure 8:
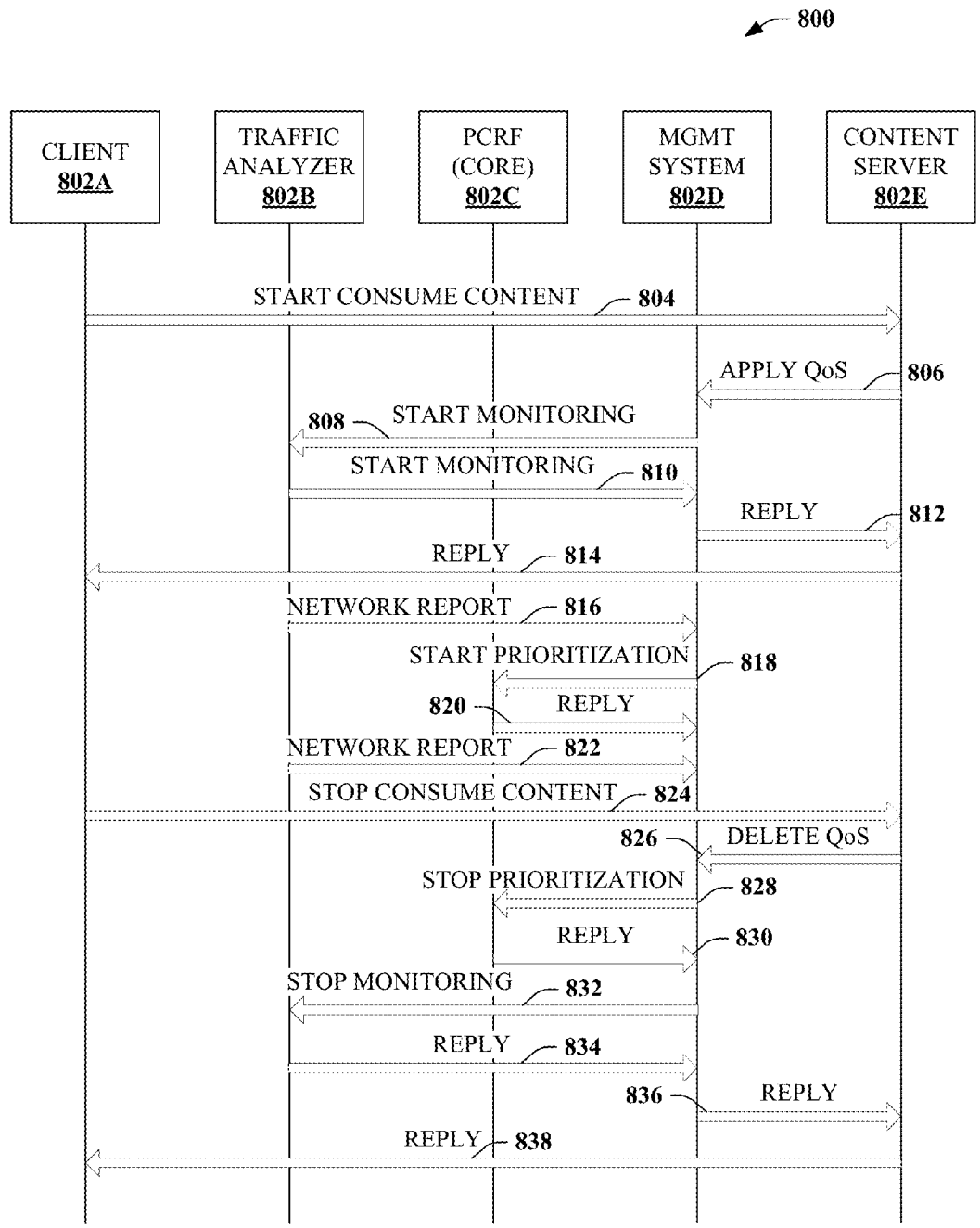
FIG. 8 depicts a diagram of an example network communication flow for network-inferred client application status reporting, in additional aspects.

FIG. 8 illustrates a block diagram of an example network communication 800 facilitating reporting of client application state according to one or more further embodiments. Network communication can comprise the following network components or network participants: client application 802A, traffic analyzer 802B, PCRF (core network) 802C, resource management system 802D and content server 802E. At 804, client application 802A can transmit a message to content server 802E requesting content. At 806, content server 802E can transmit a message to resource management system 802D instructing the application of QoS parameters suitable to consumption of the content by client application 802A. At 808, resource management system 802D can transmit a message to traffic analyzer 802B instructing traffic analyzer 802B to initiate monitoring of traffic between content server 802E and client application 802A in conjunction with consumption of the content. At 810, traffic analyzer 802B can send a response to resource management system 802D acknowledging monitoring of the traffic. At 812, resource management system 802D can transmit a message to content server 802E acknowledging the monitoring of the traffic. At 814, content server 802E can transmit a message to client application 802A in response to the request for content.

At 816, traffic analyzer 802B can transmit a network report comprising traffic statistics pertaining to traffic between content server 802E and client application 802A. In various embodiments, the traffic statistics can include data pertaining to a state of the client application 802A. At 818, resource management system 802D can employ the traffic statistics to determine an appropriate set of QoS parameters to apply to the traffic between content server 802E and client application 802A, and send a message to PCRF 802C requesting application of the set of QoS parameters to such traffic. At 820, PCRF 802C can transmit a response to resource management system 802D indicating success or failure of the application of the set of QoS parameters to the traffic.

At 822, traffic analyzer 802B can transmit a subsequent network report to resource management system 802D, comprising current traffic statistics pertaining to traffic between content server 802E and client application 802A. At 824, client application 802A can transmit a message to content server 802E, indicating termination of consumption of the traffic. At 826, content server 802E can transmit a message to resource management system 802D requesting termination of the set of QoS parameters to traffic between content server 802E and client application 802A. At 828, resource management system 802D can transmit a message to PCRF 802C instructing the set of QoS parameters to be terminated. At 830, PCRF 802C can transmit a reply to resource management system 802D acknowledging the termination of the set of QoS parameters. At 832, resource management system 802D can transmit a message to traffic analyzer 802B instructing traffic analyzer 802B to stop monitoring traffic between content server 802E and client application 802A. At 834, traffic analyzer 802B can transmit a response to resource management system 802D acknowledging termination of the monitoring. At 836, resource management component 802D can transmit a reply to content server 802E acknowledging the deletion of the set of QoS parameters. At 838, content server 802E can transmit a reply to client application 802A in response to the termination of consumption of the content.

The aforementioned diagrams have been described with respect to interaction between several systems, apparatuses, components, user interfaces, networks, network interfaces, or the like. It should be appreciated that such diagrams can include those components or systems specified therein, some of the specified components, or additional components. For example, system 100 could include population of devices 106, network access point(s) 104, traffic stream(s)/content 120 and resource and state analysis component 200, as one possible example. Sub-components could also be implemented as components electrically connected to other sub-components rather than included within a parent component. Additionally, it should be noted that two or more components could be combined into a single component providing aggregate functionality. For instance, traffic analysis component 210 can include traffic prioritization component 212 to facilitate analyzing streams of traffic and identifying characteristics of one or more streams of traffic, and rating categories of traffic, by way of a single component. Components of the disclosed systems and apparatuses can also interact with one or more other components not specifically described herein but known by those of skill in the art, or made known to one of skill in the art by way of the context provided herein.

Figure 9:
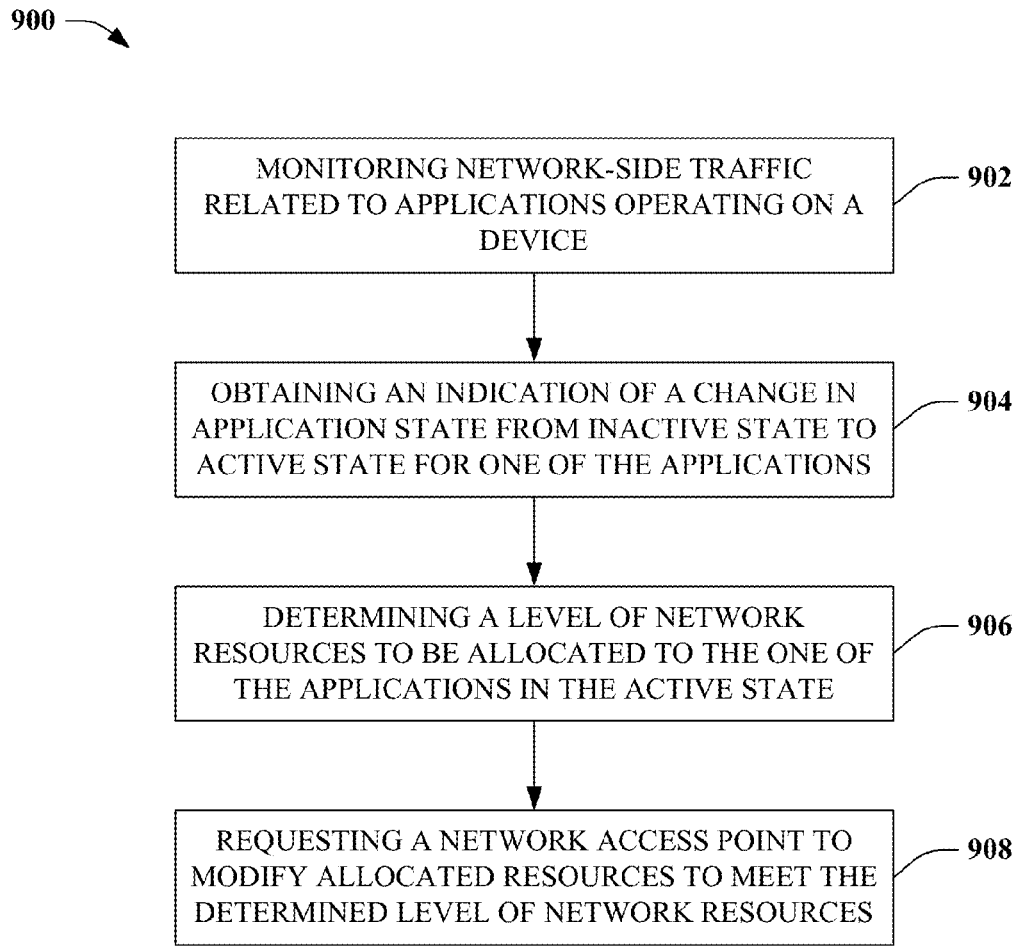
FIG. 9 depicts a flowchart of an example method for facilitating network resource prioritization for client applications according to additional disclosed aspects.

In view of the exemplary diagrams described supra, process methods that may be implemented in accordance with the disclosed subject matter will be better appreciated with reference to the flow chart of FIG. 9. While for purposes of simplicity of explanation, the method is shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the method described hereinafter. Additionally, it should be further appreciated that the method disclosed herein is capable of being stored on an article of manufacture to facilitate transporting and transferring such method to an electronic device. The term article of manufacture, as used, is intended to encompass a computer program accessible from any computer-readable device, device in conjunction with a carrier, or storage medium.

FIG. 9 illustrates a flowchart of an example method 900 for allocating communication resources to a client application of a network at least in part based on a state of the client application. At 902, method 900 can comprise monitoring network-side traffic related to client applications operating on a client device. In some embodiments, the client device is a client of the network. In other embodiments, the client applications can themselves be recognized independently as clients of the network. At 904, method 900 can comprise obtaining an indication of a change in application state from inactive state to active state for at least one of the client applications. At 906, method 900 can comprise determining a level of network resources to be allocated to the one of the client applications in the active state. At 908, method 900 can comprise requesting a network access point to modify allocated resources of the client application to meet the determined level of network resources.

In an additional embodiment, method 900 can further comprise identifying content being acquired by the one of the client applications. In one aspect, method 900 can additionally comprise determining the level of network resources at least in part based on stored information pertaining to the content. In another aspect, method 900 can further comprise referencing an access server (e.g., a content server, a charging and policy rule enforcement server, or the like), and can comprise determining the level of network resources at least in part from the tariff information.

According to further embodiments, method 900 can comprise obtaining a metric of network resource availability at a client device operating the one of the client applications. According to a further aspect, method 900 can additionally comprise calculating a metric of the allocated resources that modifies the network resource availability at the client device consistent with at least one of: a network resource availability at the client device configured to acquire and playback content being transmitted to the one of the client applications; tariff restrictions on the client device, the content or the one of the client applications, availability of network-side communication resources to allocate to the one of the client applications, or the like, or a suitable combination thereof. In another aspect, obtaining the metric of network resource availability at the client device can further comprise at least one of: monitoring client-side network traffic or obtaining an indication from the one of the client applications or from the client device that includes the metric of network resource availability.

In further embodiments, obtaining the indication of change in application state can further comprise identifying respective streams of traffic associated with respective applications operating on the client device. In one or more aspects, method 900 can further comprise identifying a characteristic of traffic of the respective streams of traffic. Additionally, method 900 can comprise referencing a stored priority metric for identified characteristics of the respective streams of traffic and identifying a change in a stream of traffic having traffic of a high priority metric that satisfies a function relating traffic priority or change in traffic to client application state. In at least one other aspect, method 900 can further comprise inferring the change in application state in response to satisfying the function.

In other embodiments, method 900 can further comprise receiving an explicit network communication identifying the change in client application state. Method 900 can further comprise receiving the explicit network communication from one of the client applications, or from an entity providing online content for the one of the client applications.

In still other embodiments, method 900 can further comprise calculating an amount of the allocated resources to meet the determined level of network resources. Additionally according to these embodiments, method 900 can further comprise obtaining a metric of availability of network-side resources for allocation, comparing the amount of the allocated resources to the metric of availability of network-side resources for allocation, and forwarding the request to the network access point for modifying the allocated resources in response to the metric of the availability being equal to or greater than the amount of the allocated resources. Additionally, method 900 can comprise identifying an amount of additional network resources to allocate to the one of the applications in response to the amount of the allocated resources being greater than the metric of availability of network-side resources for allocation. In another aspect, method 900 can further comprise re-allocating network resources from an inactive state application to an active state application to achieve the amount of the allocated resources. In alternative or additional aspects, method 900 can further comprise re-allocating network resources from another client device to the client device or the one of the client applications to achieve the amount of the allocated resources. In still other alternative or additional aspects, method 900 can comprise obtaining tariff information pertaining to the one of the client applications or to the client device, and obtaining a priority information for the one of the applications. According to these latter aspects, method 900 can further comprise determining whether the priority information allows increasing the allocated resources to the one of the client applications to the amount of the allocated resources, depending at least on the metric of availability. Alternatively or additionally, method 900 can further comprise approving increasing the allocated resources in response to the priority information allowing the increasing. In another aspect, method 900 can further comprise transmitting an offer for purchasing an increase in priority to the client device, and elevating the priority information in response to acceptance of the offer by the client device. In at least one addition aspect, method 900 can further comprise requesting the network access point to increase the allocated resources to a degree consistent with the elevated priority information.

Figure 10:
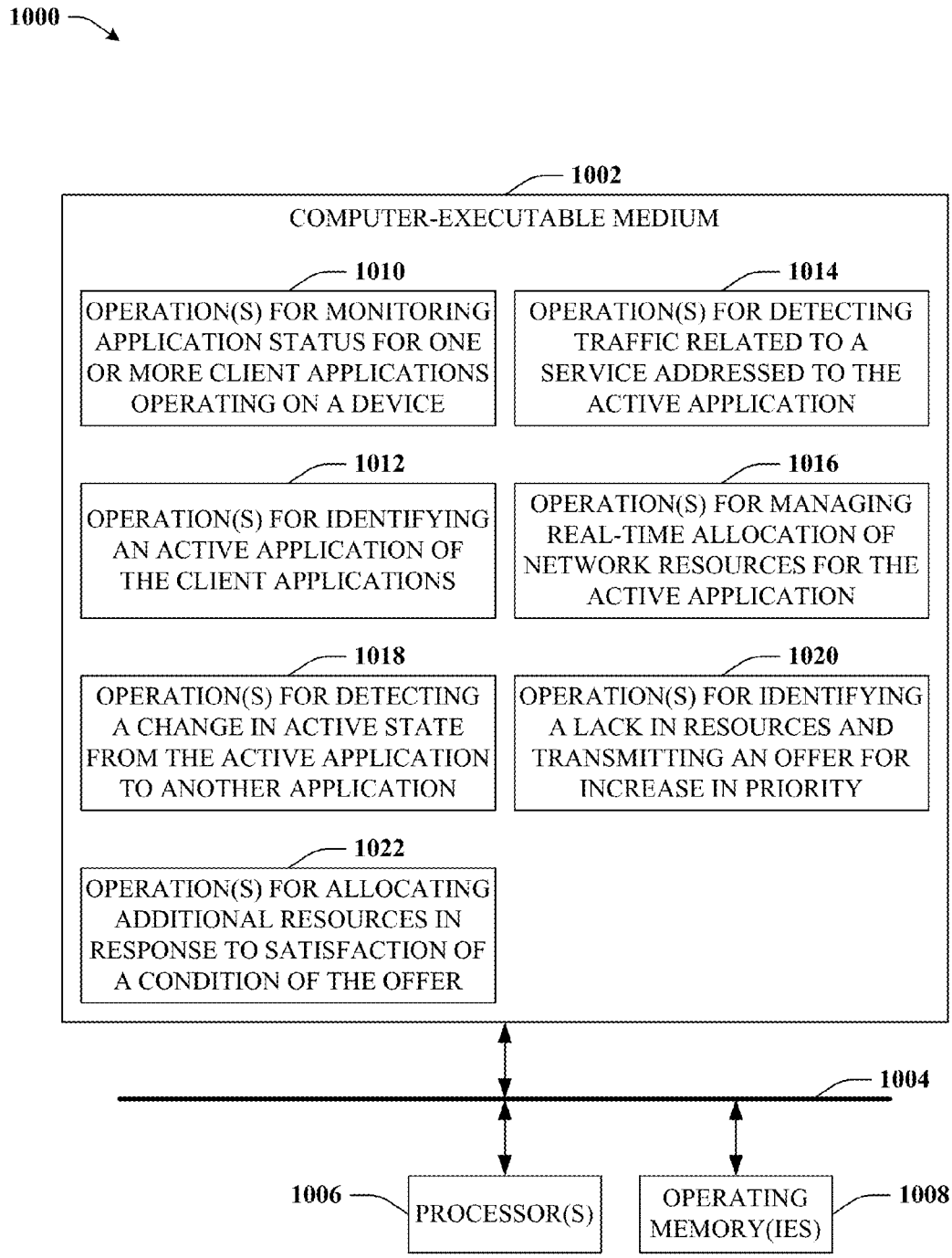
FIG. 10 illustrates a block diagram of an example computer-executable medium for allocating resources as a function of client application status.

FIG. 10 illustrates a block diagram of an example apparatus 1000 for implementing one or more aspects of the subject disclosure. Particularly, apparatus 1000 can be configured for providing network resources for consumption of content by a client of a network (e.g., a client device, a client application, or the like). For instance, apparatus 1000 can reside at least partially within a communication network or within a network server such as a network node, network gateway, terminal device, personal computer coupled with a network interface card, or the like. It is to be appreciated that apparatus 1000 is represented as including functional blocks, which can be functional blocks that represent functions implemented by a hardware, software, or combination thereof (e.g., firmware). In some aspects, the functional blocks can represent non-transitory computer-readable media. In other aspects, the functional blocks can represent transitory computer-readable media.

Apparatus 1000 can comprise a computer-executable medium 1002 comprising one or more computer-executable instructions that can be accessed over a data communication interface 1004. Data communication interface 1004 can include a communication bus, a media reader (e.g., disc reader, disk reader, driver reader, . . . ), a data ribbon, a wired data interface or data medium, a wireless data interface or data medium, a network communication interface, a network signaling interface, or the like, or a suitable combination thereof. Additionally, the computer-executable instructions can be stored in an operating memory(ies) 1008 or executed by a processor(s) 1006 to facilitate functionality of apparatus 1000.

Computer-executable medium 1002 can comprise a set of operations 1010 for monitoring application status for a client of a communication network. Further, computer-executable medium 1002 can comprise a set of operations 1012 for identifying an active application of the client, wherein the active application is displayed in a foreground of a graphic display of the client. Additionally, computer-executable medium 1002 can comprise a set of operations 1014 for detecting network traffic related to an online service being addressed for the active application. Further to the above, computer-executable medium 1002 can comprise a set of operations 1016 for managing real-time allocation of network resources for the active application in response to changes in client-side conditions or network-side conditions of a client-network communication involving the client.

In at least one embodiment, computer-executable medium 1002 can further comprise a set of operations 1018 for detecting a change in the active state from the active application to another of the client, and increasing a network resource priority related to the another of the applications, or decreasing a second network resource priority related to the active application.

In a further embodiment, computer-executable medium 1002 can also comprise a set of operations 1020 for identifying a lack in available network resources to serve the active application at a current service priority level of the active application and transmitting an offer to the active application, in response to identifying the lack in available network resources, the offer including an increase in the current service priority level upon satisfaction of a condition. Alternatively, or in addition, the computer-executable medium 1002 can comprise a set of operations 1022 for allocating additional network resources to the client in response to satisfaction of the condition by the active application.

Figure 11:
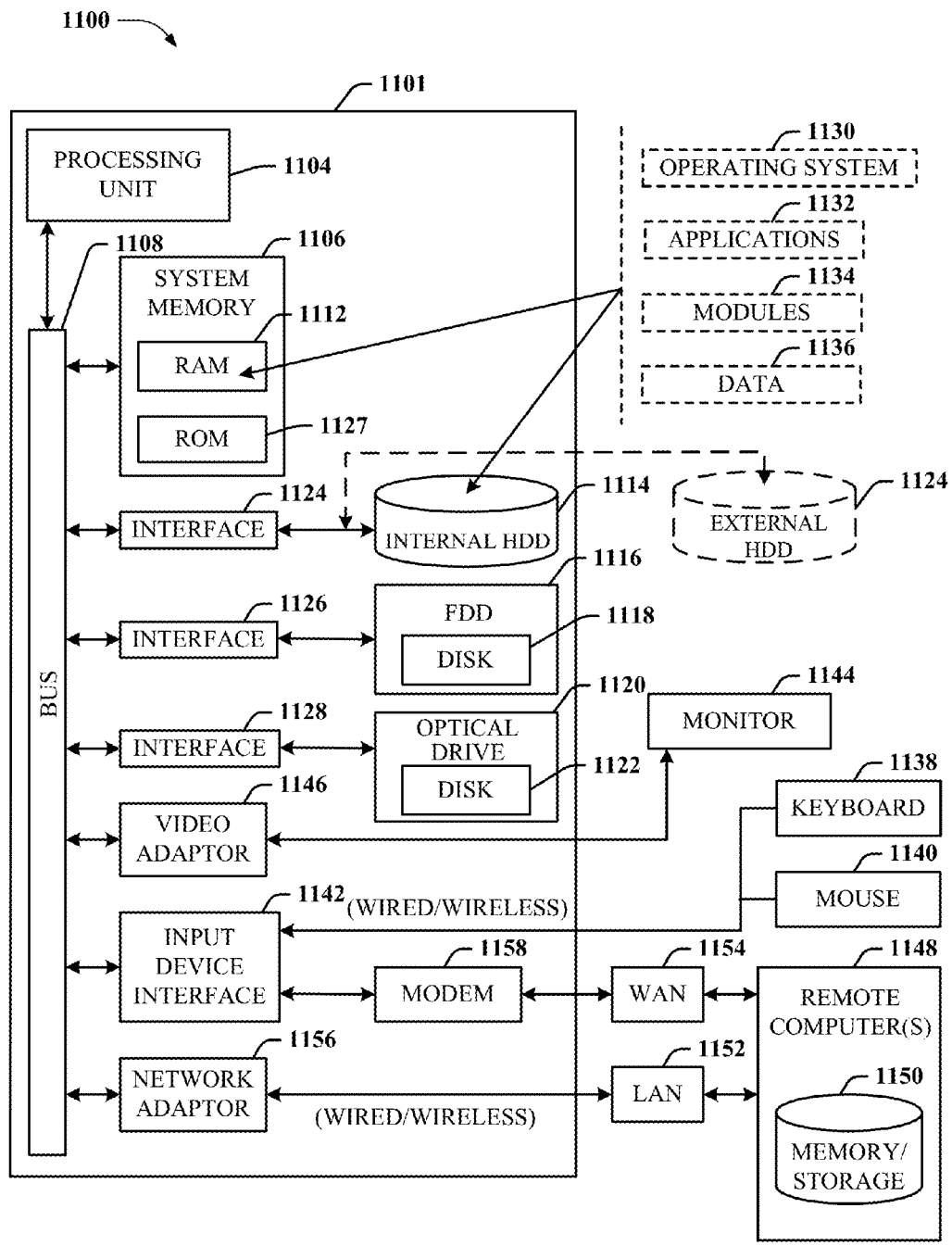
FIG. 11 illustrates a block diagram of an example electronic computing environment that can be implemented in conjunction with one or more aspects.

With reference to FIG. 11, an exemplary environment 1100 for implementing various aspects described herein includes a computer 1102, the computer 1102 including a processing unit 1104, a system memory 1106 and a system bus 1108. The system bus 1108 connects system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that aspects of the subject disclosure can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer typically includes other peripheral output devices (not shown), such as speakers, printers, etc.

The computer 1102 can operate in a networked environment using logical connections by wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or can be connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi® and Bluetooth™ wireless technologies. Thus, the communication can be a predefined structure as with a conventional network or simply an ad hoc communication between at least two devices.

Wi-Fi, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), or other bands (e.g., 802.11g, 802.11n, . . . ) so the networks can provide real-world performance similar to the basic 10BaseT wired Ethernet networks used in many offices.

Figure 12:
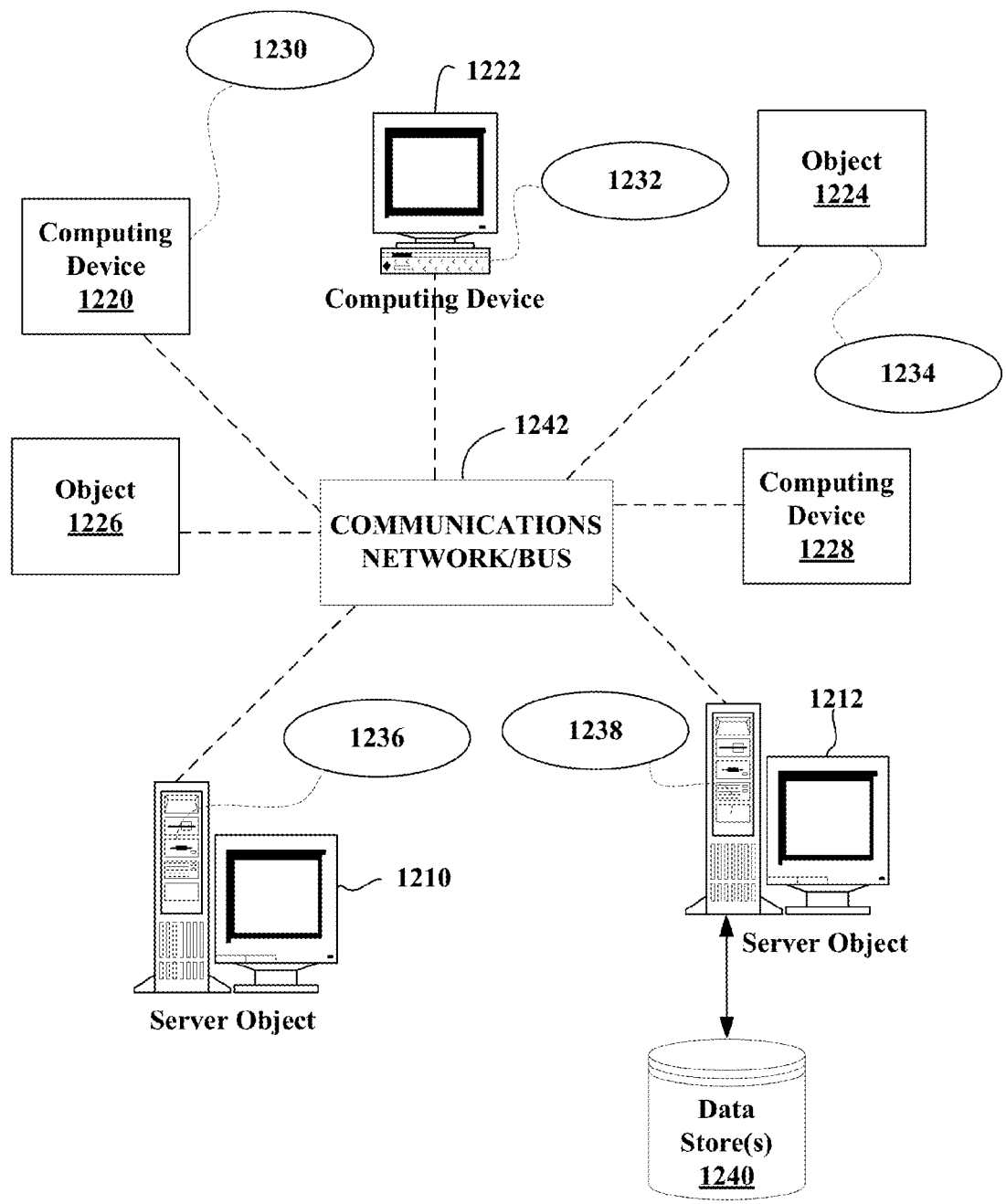
FIG. 12 depicts a block diagram of an example data communication network that can be operable in conjunction with various aspects described herein.

FIG. 12 provides a schematic diagram of an exemplary networked or distributed computing environment. The distributed computing environment comprises server objects 1210, 1212, etc. and computing devices or objects 1220, 1222, 1224, 1226, 1228, etc., which may include programs, methods, data stores, programmable logic, etc., as represented by applications 1230, 1232, 1234, 1236, 1238 and data store(s) 1240. It can be appreciated that server objects 1210, 1212, etc. and computing devices or objects 1220, 1222, 1224, 1226, 1228, etc. may comprise different devices, including network access point(s) 104, resource and state analysis component 108, resource and state analysis component 200, or similar entities depicted within the illustrations, or other devices such as a network-enabled display device, network-enabled television, set-top box with network connection and display, satellite receiver and display, mobile phone, personal digital assistant (PDA), audio/video device, MP3 players, personal computer, laptop, etc. It should be further appreciated that data store(s) 1240 can include data store 120, or another similar data store.

Each server object 1210, 1212, etc. and computing devices or objects 1220, 1222, 1224, 1226, 1228, etc. can communicate with one or more other server objects 1210, 1212, etc. and computing devices or objects 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, or may represent multiple interconnected networks, which are not shown. Each server object 1210, 1212, etc. or computing device or object 1220, 1222, 1224, 1226, 1228, etc. can also contain an application, such as applications 1230, 1232, 1234, 1236, 1238, that might make use of an API, or other object, software, firmware or hardware, suitable for communication with or implementation of the techniques for search augmented menu and configuration functions provided in accordance with various embodiments of the subject disclosure.

There is a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems for search augmented menu and configuration functions as described in various embodiments.

Thus, a host of network topologies and network infrastructures, such as client/server, peer-to-peer, or hybrid architectures, can be utilized. One or more of these network topologies can be employed by population of devices 106, or network access point(s) 104, content server 304, network 306, resource management system 308, traffic analyzer 310, PCRF 312, PCEF 314, and others, for communicating with a network. The "client" is a member of a class or group that uses the services of another class or group to which it is not related. A client can be a process, e.g., roughly a set of instructions or tasks, that requests a service provided by another program or process. The client process utilizes the requested service, in some cases without having to "know" any working details about the other program or the service itself. A client device can be a computing device or object 1220, 1222, 1224, 1226, 1228 upon which a client process operates or is executed, in one or more disclosed aspects.

In a client/server architecture, such as a networked system, a client is usually a computer that accesses shared network resources provided by another computer, e.g., a server. In the illustration of FIG. 12, as a non-limiting example, computing devices or objects 1220, 1222, 1224, 1226, 1228, etc. can be thought of as clients and server objects 1210, 1212, etc. can be thought of as servers where server objects 1210, 1212, etc., acting as servers provide data services, such as receiving data from client computing devices or objects 1220, 1222, 1224, 1226, 1228, etc., storing of data, processing of data, transmitting data to client computing devices or objects 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the server objects 1210, 1212, etc. can be Web servers with which other computing devices or objects 1220, 1222, 1224, 1226, 1228, etc. communicate via any of a number of known protocols, such as the hypertext transfer protocol (HTTP). Server objects 1210, 1212, etc. acting as servers may also serve as clients, e.g., computing devices or objects 1220, 1222, 1224, 1226, 1228, etc., as may be characteristic of a distributed computing environment.

The subject matter described herein can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

The word "exemplary" where used herein means serving as an example, instance, or illustration. For the avoidance of doubt, the subject matter disclosed herein is not limited by such examples. In addition, any aspect, embodiment or design described herein as "exemplary", "demonstrative", "illustrative", or the like, is not necessarily to be construed as preferred or advantageous over other aspects or designs, nor is it meant to preclude equivalent exemplary structures and techniques known to those of ordinary skill in the art.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
   a memory to store instructions; and
   a processor, communicatively coupled to the memory, that executes or facilitates execution of the instructions, the instructions comprising:
   a device-side application monitoring component configured to identify a status of an application of applications operating on a device;
   a service-side resource monitoring component configured to track network resource availability of a service network associated with the device;
   a resource management component configured to compare resource demand of the application with a metric of resource availability of the service network, and modify allocation of service network resources to the application in response to a determination that the status of the application is a predetermined status, and in response to a determination that the resource demand satisfies a function with respect to resources currently allocated to the application; and
   a traffic analysis component configured to
      inspect data transmitted to or from the device,
      identify respective streams of the data associated with respective applications of the applications operating on the device,
      infer identity information indicative of an identity of the application, and
      identify other identity information indicative of a category of application traffic associated with at least one of the respective applications, the category of application traffic being selected from at least one of: data traffic, video traffic, audio traffic, voice traffic, audio-video traffic, or video-voice traffic.

2. The system of claim 1, the instructions further comprising a traffic prioritization component configured to assign respective priority ratings to respective categories of application traffic, the respective categories comprising the category of application traffic.

3. The system of claim 2, wherein the application operating on the device is an active application, and wherein the traffic analysis component infers the identity of the active application from one of the respective applications, at least in part from a priority rating value of one of the streams of the data that is associated with the at least one of the respective applications.

4. The system of claim 1, wherein the traffic analysis component infers the identity of the application at least in part in response to an increase in traffic on one of the streams of the data that satisfies a second function relating increase in traffic to the status of the application.

5. The system of claim 1, wherein the resource management component is further configured to increase allocation of service network resources to the application in response to the resource demand being determined to be greater than the currently allocated resources.

6. The system of claim 5, wherein the resource management component is further configured to cause the service network to increase allocation of network resources to the application to satisfy the increase in allocation of service network resources.

7. The system of claim 5, wherein the resource management component is further configured to cause the service network to reallocate service network resources from a second application operating on the device and to the application to satisfy the increase in allocation of service network resources.

8. The system of claim 5, wherein the resource management component allocates service network resources allocated to the device that exceed the resource demand of the application, to a second application operating on the device.

9. The system of claim 1, the instructions further comprising an advertising component configured to transmit a resource purchase offer to the application, facilitating purchase of additional network resources from the device to meet the resource demand.

10. The system of claim 9, wherein the advertising component facilitates purchase through payment of money, expenditure of user points or playback of an advertisement.

11. The system of claim 1, the instructions further comprising an interface component that receives an indication from the device or the application that facilitates the determination of the status of the application.

12. The system of claim 11, wherein the indication is one of:
   an explicit indicator transmitted by the device or the application that identifies the status of the application or identifies a quality of service parameter usable for determining the modified allocation of service network resources; or
   an implicit indicator, identified by an analysis component that monitors service side network activity, within a stream of traffic associated with the device.

13. The system of claim 1, the instructions further comprising a content service interface component that receives a transmission from a content provider indicative of the status of the application.

14. A method, comprising:
   monitoring, by a system comprising a processor, network-side traffic related to applications operating on a device;

obtaining an indication of a change in application state from inactive state to active state for an application of the applications; wherein obtaining the indication of the change in application state further comprises:

identifying respective streams of traffic associated with respective applications of the applications operating on the device;

identifying respective characteristics of the respective streams of traffic;

referencing a stored priority metric for the respective characteristics of the respective streams of traffic;

identifying a variation in a stream of traffic having traffic of a high priority metric that satisfies a function relating traffic priority or variations in traffic to application state;

inferring the change in application state in response to the function being determined to be satisfied;

determining a level of network resources to be allocated to the application of the applications in the active state; and requesting a network access point to modify allocated resources to meet the level of network resources.

15. The method of claim 14, further comprising identifying content being acquired by the application of the applications.

16. The method of claim 15, wherein the determining comprises determining the level of network resources at least in part based on stored information pertaining to the content.

17. The method of claim 15, further comprising referencing an access server for the application of the applications and obtaining tariff information pertaining to the content.

18. The method of claim 17, further comprising determining the level of network resources at least in part from the tariff information.

19. The method of claim 14, further comprising obtaining a metric of network resource availability at the device.

20. The method of claim 19, further comprising calculating a metric of the allocated resources that modifies the network resource availability at the device consistent with at least one of:

a network resource availability at the device configured to acquire and playback content being transmitted to the application of the applications;

a quality of service parameter provided by the application of the applications;

tariff restrictions on the device, the content or the application of the applications; or availability of network-side communication resources to allocate to the application of the applications.

21. The method of claim 19, wherein obtaining the metric of network resource availability at the device further comprises at least one of:

monitoring device-side network traffic; or obtaining an indication from the application of the applications or from the device that includes the metric of network resource availability.

22. The method of claim 14, further comprising receiving an explicit network communication identifying the change in application state.

23. The method of claim 22, further comprising receiving the explicit network communication from the application of the applications, or from an entity providing online content for the application of the applications.

24. The method of claim 14, further comprising calculating an amount of the allocated resources to meet the level of network resources.

25. The method of claim 24, further comprising:

obtaining a metric of availability of network-side resources for allocation;

comparing the amount of the allocated resources to the metric of availability of network-side resources for allocation;

forwarding the request to the network access point for modification of the allocated resources in response to the metric of availability being determined to be equal to or greater than the amount of the allocated resources; and identifying an amount of additional network resources to allocate to the one of the applications in response to the amount of the allocated resources being determined to be greater than the metric of availability of network-side resources for allocation.

26. The method of claim 25, further comprising re-allocating network resources from an inactive state application to an active state application to achieve the amount of the allocated resources.

27. The method of claim 25, further comprising re-allocating network resources from another device to the device and the application of the applications to achieve the amount of the allocated resources.

28. The method of claim 25, further comprising obtaining tariff information pertaining to the application of the applications or to the device, and obtaining a priority information for the application of the applications.

29. The method of claim 28, further comprising determining whether the priority information allows increasing the allocated resources to the application of the applications to the amount of the allocated resources, depending at least on the metric of availability.

30. The method of claim 29, further comprising approving increasing the allocated resources in response to the priority information allowing the increasing.

31. The method of claim 29, further comprising transmitting an offer for purchase of an increase in priority to the device, and elevating the priority information in response to acceptance of the offer by the device.

32. The method of claim 31, further comprising requesting the network access point to increase the allocated resources to a degree consistent with the elevated priority information.

33. The method of claim 14, further comprising employing the device as a part or an entirety of the system.

34. A non-transitory computer readable medium comprising computer-executable instructions that, in response to execution, cause a system comprising a processor to perform operations, comprising:

monitoring application status for applications operating on a client of a communication network;

identifying an active application of the applications operating on the client, wherein the active application is displayed in a foreground of a graphic display of the client;

detecting network traffic related to an online service being addressed for the active application; and managing real-time allocation of network resources for the active application in response to changes in client-side conditions or network-side conditions of a client-network communication involving the client, wherein the identifying the active application further comprises:

detecting respective network traffic for respective ones of multiple applications operating on the client of the communication network;

identifying respective characteristics of the respective network traffic;

referencing a stored priority metric for the respective characteristics of the respective network traffic;

identifying a change in a stream of traffic having traffic of a high priority metric that satisfies a function relating traffic priority or changes in traffic to application state; and inferring the active application of the applications in response to the function being determined to be satisfied.

35. The non-transitory computer readable medium of claim 34, wherein the operations further comprise detecting a change in the active state from the active application to another of the applications operating on the client, and increasing a network resource priority related to the another of the applications, or decreasing a second network resource priority related to the active application.

36. The non-transitory computer readable medium of claim 34, wherein the operations further comprise:

identifying a lack in available network resources to serve the active application at a current service priority level of the active application; and transmitting an offer to the active application, in response to identifying the lack in available network resources, the offer including an increase in the current service priority level as a result of satisfaction of a condition.

37. The non-transitory computer readable medium of claim 36, further comprising allocating additional network resources to the active application in response to satisfaction of the condition by the active application.

* * * * *